United States Patent [19]
Yamanashi

[11] Patent Number: 5,172,273
[45] Date of Patent: Dec. 15, 1992

[54] ZOOM LENS SYSTEM
[75] Inventor: Takanori Yamanashi, Tokyo, Japan
[73] Assignee: Olympus Optical Co., Ltd., Tokyo, Japan
[21] Appl. No.: 661,327
[22] Filed: Feb. 27, 1991
[30] Foreign Application Priority Data Feb. 28, 1990 [JP] Japan .................................. 2-45697

[51] Int. Cl.$^5$ .............................................. G02B 15/18
[52] U.S. Cl. ..................................... 359/684; 359/676
[58] Field of Search ....................... 359/684, 676, 683

[56] References Cited

U.S. PATENT DOCUMENTS 4,701,033 10/1987 Masumoto .
4,787,719 11/1988 Imai ..................................... 359/684
4,840,468 6/1989 Tanaka ............................... 359/684
4,963,006 10/1990 Inadome ............................ 359/684

Primary Examiner—Constantine Hannaher
Assistant Examiner—Richard Hanig
Attorney, Agent, or Firm—Cushman, Darby & Cushman

[57] ABSTRACT

A zoom lens system comprising, in the order from the object side, a first lens unit having a positive refractive power, a second lens unit having a positive or negative refractive power, a third lens unit having a positive refractive power and a fourth lens unit having a negative refractive power, adapted so as to perform variation of focal length by moving said lens units along the optical axis, and adapted so as to perform focusing by moving at least one of the lens units other than said first lens unit. This zoom lens system can be focused on an object located at a very short distance.

10 Claims, 28 Drawing Sheets

ZOOM LENS SYSTEM

BACKGROUND OF THE INVENTION a) Field of the Invention

The present invention relates to a zoom lens system designed for use with compact cameras and capable of photographing objects located at short distances.

b) Description of the Prior Art

In the recent years where cameras are designed so as to be fully automated, equipped with multiple functions and highly portable, zoom lens systems are generally adopted for these cameras for broadening photographing ranges.

In order to shorten total lengths of the zoom lens systems to be used with the cameras of this type, it is desirable to select the refractive power distribution which is similar to that of the telephoto type of lens systems, or the zoom lens systems can be made compact by selecting a paraxial refractive power distribution which locates the lens systems close to the image surfaces thereof.

As for focusing method for zooming lens systems, it is general to perform focusing by moving the first lens unit which can be controlled in the simplest manner.

When the first lens unit is selected as the focusing lens unit in a zoom lens system which covers a field angle corresponding to that of a wide-angle lens system, however, the front lens component has a large diameter and makes it difficult to remarkably shorten the distance as measured from the lens system to an object to be photographed with the lens system. This is because the focusing lens unit has a weak refractive power and the distance as measured to the entrance pupil is changed by focusing. Especially in a case of a zoom lens system which has a super wide field angle at the wide position thereof, the focusing method mentioned above does not permit shortening the photographing distance at which the zoom lens system can be focused on an object.

Further, as a zoom lens system which adopts the rear focusing method, i.e., performs focusing by moving the lens unit which has a negative refractive power and arranged on the most image side, there is known the zoom lens system disclosed by U.S. Pat. No. 4,701,033. However, this zoom lens system has a low vari-focal ratio. When an attempt is made to design this zoom lens system so as to have a higher vari-focal ratio and a more compact design, it will be difficult to focus this zoom lens system on an object. This is because an attempt to maintain the required amount of the marginal ray at the wide position of this zoom lens system will enlarge the diameter of the rear lens component, thereby enlarging the zoom lens system.

It is difficult to obtain a zoom lens system which can be focused on an object located at a very short distance and has a compact design when the first lens unit is selected as the focusing lens unit as in the general zoom lens systems as already described above.

Furthermore, there are known the inner focusing method and rear focusing method which select the lens units other than the first lens unit as focusing lens units. These focusing methods have advantages to permit remarkably shortening the distances to objects to be photographed and making zoom lens systems compact though the methods inevitably complicate the mechanism, software, etc. for controlling the focusing lens units. However, these focusing methods have a common defect that they allow the optical performance of the zoom lens systems to be degraded by focusing.

SUMMARY OF THE INVENTION

A primary object of the present invention is to provide a zoom lens system which has a compact design and can be focused on an object located at a short distance.

The zoom lens system according to the present invention comprises, in the order from the object side, a first lens unit having a positive refractive power, a second lens unit having a positive or negative refractive power, a third lens unit having a positive refractive power and a fourth lens unit having a negative refractive power, adapted so as to perform variation of focal length by moving all the lens units along the optical axis, and further adapted so as to perform focusing by moving at least one of the lens units other than the first lens unit. The zoom lens system according to the present invention can be focused, not only by moving at least one of the lens unit other than the first lens unit, but also by varying airspaces reserved between the lens components arranged in the lens unit or units or by moving the lens unit or units and varying the airspaces reserved between the lens components arranged in said lens unit or units.

Focusing of the zoom lens system according to the present invention will be described in detailed below:

First, description will be made on a focusing mode in which the fourth lens unit is moved.

The zoom lens system according to the present invention is designed, in the fundamental composition thereof, as a telephoto type lens system in which the first through third lens units have a positive total refractive power, whereas the fourth lens unit has a strongly negative refractive power.

The total refractive power $\phi_{123}$ of the first through third lens units arranged in the zoom lens system described above, and the refractive power $\phi$ of the zoom lens system are expressed by the following formulae (i) and (ii) respectively:

$$\phi_{123} = \phi_1 (1-e_2'\cdot\phi_3) + (1-e_1'\cdot\phi_1)(\phi_2+\phi_3-e_2'\cdot\phi_2\cdot\phi_3) > 0 \quad (i)$$

$$\phi = \phi_{123} + \phi_4 - e'\cdot\phi_{123}\cdot\phi_4 \quad (\phi_4 < 0) \quad (ii)$$

wherein the reference symbol $\phi_1$, $\phi_2$, and $\phi_3$ represent the refractive powers of the first lens unit, the second lens unit and the third lens unit respectively, the reference symbol $e_1'$ designates the airspace reserved between the first lens unit and the second lens unit, the reference symbol $e_2'$ denotes the airspace reserved between the second lens unit and the third lens unit, and the reference symbol $e'$ represents the distance as measured between the principal point of the lens system composed of the first through third lens units and that of the fourth lens unit.

For zooming this type of zoom lens system, the lens units are moved as illustrated in FIG. 28. Speaking concretely, all of the lens units are moved toward the object side for zooming the lens system from the wide position (taken here as the standard position) to the tele position. Moving distances for these lens units are determined on the basis of balance between the variation of focal length and correction of aberrations. For the zoom lens system having the composition described above, the fourth lens unit having the negative refractive power contributes to the variation of focal length and has a magnification, at the tele position, higher than that of the second lens unit or that of the thrid lens unit. That is to say, the magnifications of these lens units have the following relations:

$$\beta_{4T} > |\beta_{3T}| \text{ and } \beta_{4T} > |\beta_{2T}| \qquad \text{(iii)}$$

wherein the reference symbols $\beta_{2T}$, $\beta_{3T}$ amd $\beta_{4T}$ represent the magnifications of the second lens unit, the third lens unit and the fourth lens unit respectively at the tele position.

When the focusing lens unit is moved for a short distance, the movement of the lens unit for focusing can be controlled more easily as the focusing lens unit has a lower longitudinal magnification on the image surface. When focusing is performed by moving the fourth lens unit which has the high magnification at the tele position as described above, it is therefore necessary to control with high precision the movement of the fourth lens unit for focusing. Accordingly, the focusing by moving the fourth lens unit is suited for a zoom lens system which has a low magnification, i.e., a super wide field angle at the wide position thereof.

For the zoom lens system according to the present invention, the lens units to be moved for focusing were selected on the basis of not only on examination of the paraxial refractive power distribution but also upon consideration of variations of aberrations to be caused by moving the lens unit in the zoom lens system composed of thick lens elements. For focusing the zoom lens system preferred as Embodiment 1 of the present invention to be described later, for example, the airspaces to be varied for focusing are selected, on the basis of a table of the aberration coefficients and another table of aberration correction coefficients prepared specifically for the zoom lens system (Tables 1 and 2 to be described later), so as to minimize the aberrations to remain in focusing lens units, variations of the aberration coefficients and variations of aberrations.

Said airspaces to be varied for focusing the zoom lens system may be the airspaces reserved between the lens units or airspaces reserved between the lens components arranged in one of the lens units so far as aberrations are not varied or variations of each aberration caused by variations of the airspaces are cancelled with each other.

The zoom lens system according to the present invention can be focused not only by moving the fourth lens unit as described above, but also by selecting the lens units other than the fourth lens unit as the focusing lens units. For example, the zoom lens system according to the present invention can be focused by moving the second lens unit and the third lens unit integrally.

Since the airspace reserved between the second lens unit and the third lens unit is varied by zooming the zoom lens system according to the present invention from the wide position to the tele position, the total focal length of the lens system composed of the second lens unit and the third lens unit is varied by zooming. The total refractive power of the lens system composed of the second lens unit and the third lens unit is expressed by the following formula (iv), and the formula (v) establishes:

$$\left. \begin{array}{l} \phi_{23W} = \phi_2 + \phi_3 - e_{23W}' \cdot \phi_2 \cdot \phi_3 \\ \phi_{23T} = \phi_2 + \phi_3 - e_{23T}' \cdot \phi_2 \cdot \phi_3 \end{array} \right\} \qquad \text{(iv)}$$

$$\phi_{23W} \neq \phi_{23T} \qquad \text{(v)}$$

wherein the reference symbols $\phi_{23W}$ and $\phi_{23T}$ repersent the total refractive power of the second lens unit and the third lens unit at the wide position and the tele position respectively, and the reference symbols $e_{23W}'$ and $e_{23T}'$ designate the airspaces reserved between the second lens unit and the third lens unit at the wide position and the tele position respectively.

When the second lens unit and the thrid lens unit are moved integrally for focusing the zoom lens system according to the present invention as described above, the total focal length of the focusing lens units is not kept constant.

The shift of the image surface caused by moving said focusing lens units is fundamentally related to the longitudinal magnification of the focusing lens units (the total longitudinal magnification of the seocnd lens unit and the third lens unit) expressed by the following formula (vi):

$$\gamma_{23} = \gamma_4 - \gamma_{234} \; (\gamma_4 > \gamma_{234}) \qquad \text{(vi)}$$

wherein the reference symbol $\gamma_4 = \beta_4^2$ and $\gamma_{234} = (\beta_{234})^2$.

In the formula (vi) mentioned above, the reference symbol $\gamma_4$ represents the longitudinal magnification of the fourth lens unit, the reference symbol $\beta_4$ designates the lateral magnification of the fourth lens unit, the reference symbol $\gamma_{234}$ denotes the total longitudinal magnification of the second, third and fourth lens units, and the reference symbol $\beta_{234}$ represents the total lateral magnification of the second, third and fourth lens units.

Further, as is understood from the above-mentioned formula (iv), the distance of the shift of the image surface caused by moving the second lens unit, the third lens unit and the fourth lens units integrally for focusing the zoom lens unit according to the present invention is shorter than that of the shift of the image surface caused by moving the fourth lens unit only for focusing said lens system.

As is clear from the foregoing description, it is desirable that the value of $\gamma_4$ is not so large when the zoom lens system according to the present invention has a high vari-focal ratio.

When variation of the optical performance of the zoom lens system according to the present invention is taken into consideration, it is desirable that the spherical aberration correction coefficient or astigmatism correction coefficient for the airspace reserved between the first lens unit and the second lens unit has the directivity (positive or negative sign) which is the same as that of the spherical aberration correction coefficient or astigmatism correction coefficient for the airspace reserved between the third lens unit and the fourth lens unit. In such a case, aberrations varied by the focusing will be cancelled with each other between these airspaces, thereby suppressing variations of aberrations in the zoom lens system as a whole.

When the zoom lens system according to the present invention is focused by moving the second lens unit and the third lens unit integrally, the second lens unit alone or the third lens unit alone, the spherical aberration and astigmatism are varied little since an aperture stop is arranged between these lens units or in said lens unit, and a short moving distance is sufficient for focusing since the total focal length of these lens units or the lens unit is short, whereby the zoom lens system can be focused quickly though the movement of the lens units or lens unit must be controlled with high precision.

DETAILED DESCRIPTION OF THE PREFERRED EMBODIMENTS

Figure 1:
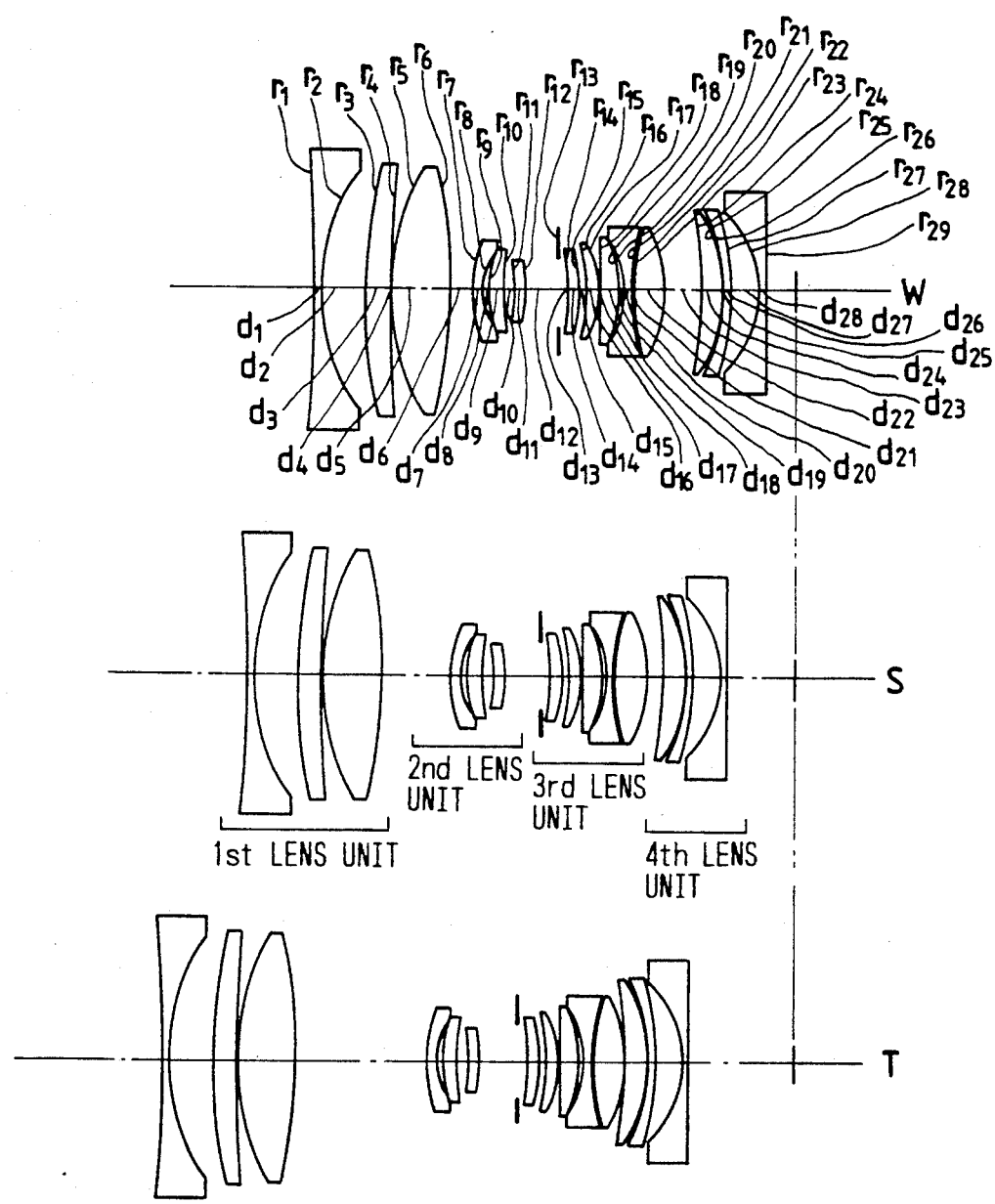
FIG. 1 through FIG. 3 show sectional views illustrating compositions of Embodiments 1 through 3 of the zoom lens system according to the present invention.
Figure 2:
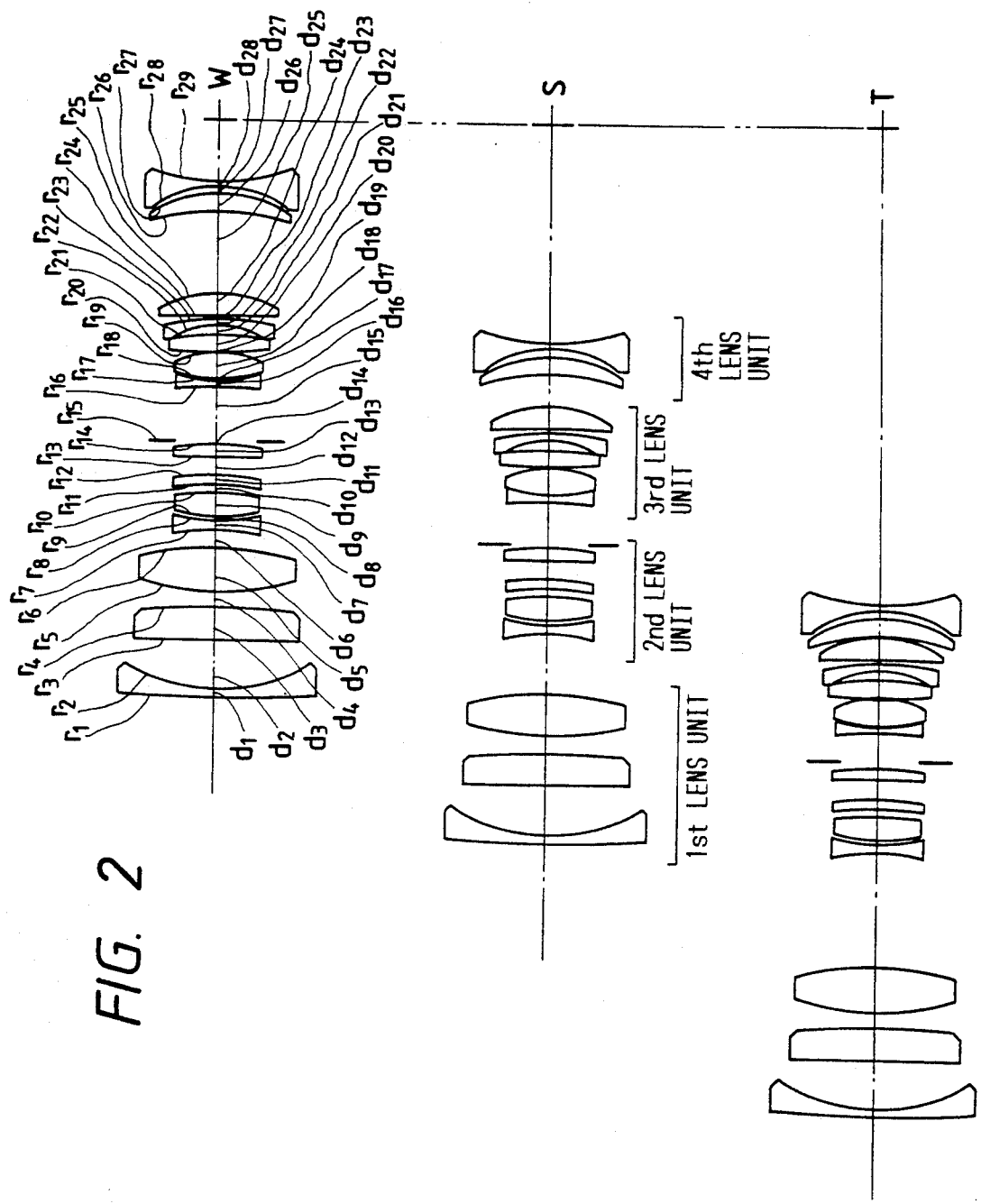
Figure 3:
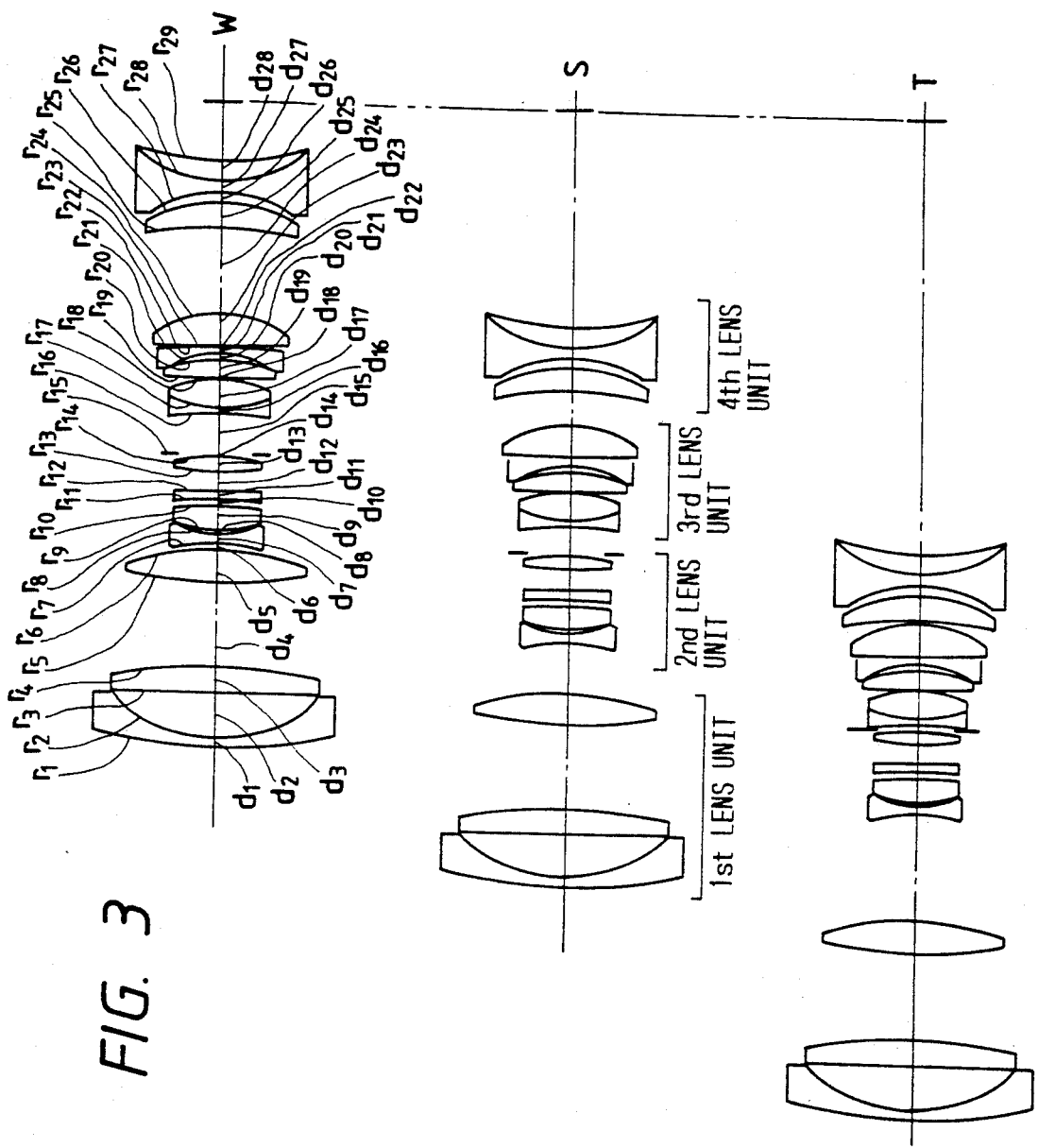

Now, the present invention will be described in more detail below with reference to the preferred embodiments illustrated in the accompanying drawings and given in the form of the following numerical data:

Embodiment 1
$f = 21.585 \sim 32.85$, $F/4.5 \sim F/5.65$
$2\omega = 90.2° \sim 66.7°$ $r_1 = -339.7273$
$\quad d_1 = 1.4000 \quad n_1 = 1.85026 \quad \nu_1 = 32.28$
$r_2 = 34.8367$
$\quad d_2 = 6.7792$
$r_3 = 83.7098$
$\quad d_3 = 4.0250 \quad n_2 = 1.60300 \quad \nu_2 = 65.48$
$r_4 = 327.4126$
$\quad d_4 = 0.1000$
$r_5 = 39.1459$
$\quad d_5 = 9.3653 \quad n_3 = 1.57444 \quad \nu_3 = 56.47$
$r_6 = -79.0262$
$\quad d_6 = D_1 \quad$ (variable)
$r_7 = 22.6291$
$\quad d_7 = 1.4000 \quad n_4 = 1.75700 \quad \nu_4 = 47.87$
$r_8 = 9.9510$
$\quad d_8 = 1.0019$
$r_9 = 17.5753$
$\quad d_9 = 2.5000 \quad n_5 = 1.80518 \quad \nu_5 = 25.43$
$r_{10} = 65.8266$
$\quad d_{10} = 1.6440$
$r_{11} = -26.4053$
$\quad d_{11} = 1.7000 \quad n_6 = 1.69680 \quad \nu_6 = 56.49$
$r_{12} = -26.1199$
$\quad d_{12} = 1.1000$
$r_{13} = \infty \text{ (stop)}$
$\quad d_{13} = D_2 \quad$ (variable)
$r_{14} = -46.6740$
$\quad d_{14} = 2.1800 \quad n_7 = 1.60300 \quad \nu_7 = 65.48$
$r_{15} = 20.1338$
$\quad d_{15} = 0.8500$
$r_{16} = -27.5313$ (aspherical surface)
$\quad d_{16} = 2.2500 \quad n_8 = 1.48749 \quad \nu_8 = 70.20$
$r_{17} = -13.5722$
$\quad d_{17} = 0.2000$
$r_{18} = -161.1158$ -continued Embodiment 1
$f = 21.585 \sim 32.85$, $F/4.5 \sim F/5.65$
$2\omega = 90.2° \sim 66.7°$ $\quad d_{18} = 3.0500 \quad n_9 = 1.73400 \quad \nu_9 = 51.49$
$r_{19} = -17.7338$
$\quad d_{19} = 0.8830$
$r_{20} = -13.4699$
$\quad d_{20} = 1.2500 \quad n_{10} = 1.69895 \quad \nu_{10} = 30.12$
$r_{21} = 32.3737$
$\quad d_{21} = 0.3540$
$r_{22} = 35.1267$
$\quad d_{22} = 5.0500 \quad n_{11} = 1.60300 \quad \nu_{11} = 65.48$
$r_{23} = -19.6850$
$\quad d_{23} = D_3 \quad$ (variable)
$r_{24} = -71.1125$
$\quad d_{24} = 3.5500 \quad n_{12} = 1.84666 \quad \nu_{12} = 23.78$
$r_{25} = -22.7892$
$\quad d_{25} = 0.1500$
$r_{26} = -25.2759$
$\quad d_{26} = 1.1400 \quad n_{13} = 1.84666 \quad \nu_{13} = 23.88$
$r_{27} = -44.0253$
$\quad d_{27} = 4.3383$
$r_{28} = -15.2523$ (aspherical surface)
$\quad d_{28} = 1.1000 \quad n_{14} = 1.83481 \quad \nu_{14} = 42.72$
$r_{29} = 2407.1072$
aspherical surface coefficient
(16th surface)
$\quad A_4 = -0.41714 \times 10^{-5}, A_6 = 0.42167 \times 10^{-7}$
$\quad A_8 = 0.92130 \times 10^{-9}, A_{10} = 0.17517 \times 10^{-10}$
(28th surface)
$\quad A_4 = 0.25829 \times 10^{-4}, A_6 = 0.12129 \times 10^{-6}$
$\quad A_8 = -0.33129 \times 10^{-9}, A_{10} = 0.24481 \times 10^{-11}$

| f | W | S | T |
|---|---|---|---|
| $D_1$ | 3.651 | 11.131 | 20.671 |
| $D_2$ | 5.603 | 6.151 | 6.609 |
| $D_3$ | 5.820 | 2.538 | 0.100 |

Embodiment 2
$f = 28.65 \sim 102$, $F/4.65 \sim F/7.64$
$2\omega = 74.1° \sim 23.9°$ $r_1 = 277.3145$
$\quad d_1 = 1.4500 \quad n_1 = 1.83400 \quad \nu_1 = 37.16$
$r_2 = 33.6428$ (aspherical surface)
$\quad d_2 = 8.6961$
$r_3 = 1318.5041$
$\quad d_3 = 5.8000 \quad n_2 = 1.67000 \quad \nu_2 = 57.33$
$r_4 = -160.9367$
$\quad d_4 = 3.0740$
$r_5 = 50.6574$
$\quad d_5 = 8.0469 \quad n_3 = 1.60300 \quad \nu_3 = 65.48$
$r_6 = -51.2298$
$\quad d_6 = D_1 \quad$ (variable)
$r_7 = -30.7906$
$\quad d_7 = 1.4500 \quad n_4 = 1.83481 \quad \nu_4 = 42.72$
$r_8 = 24.0710$
$\quad d_8 = 0.7678$
$r_9 = 31.9068$
$\quad d_9 = 4.2500 \quad n_5 = 1.80518 \quad \nu_5 = 25.43$
$r_{10} = -60.1435$
$\quad d_{10} = 1.4107$
$r_{11} = -52.3708$ (aspherical surface)
$\quad d_{11} = 1.7000 \quad n_6 = 1.83481 \quad \nu_6 = 42.72$
$r_{12} = -50.6366$
$\quad d_{12} = 3.4578$
$r_{13} = -1960.4425$
$\quad d_{13} = 2.2000 \quad n_7 = 1.69680 \quad \nu_7 = 56.49$
$r_{14} = -49.4049$
$\quad d_{14} = 1.1000$
$r_{15} = \infty \text{ (stop)}$
$\quad d_{15} = D_2 \quad$ (variable)
$r_{16} = -163.9331$
$\quad d_{16} = 1.2500 \quad n_8 = 1.83400 \quad \nu_8 = 37.16$
$r_{17} = 27.1270$
$\quad d_{17} = 0.2015$
$r_{18} = 28.3458$
$\quad d_{18} = 4.8500 \quad n_9 = 1.51728 \quad \nu_9 = 69.56$
$r_{19} = -19.4610$ -continued

Embodiment 2
$f = 28.65 \sim 102,$    F/4.65 ~ F/7.64
$2\omega = 74.1° \sim 23.9°$

|  |  |  |  |
|---|---|---|---|
| | $d_{19} = 0.2151$ | | |
| $r_{20} = 237.0372$ | | | |
| | $d_{20} = 3.2500$ | $n_{10} = 1.69942$ | $\nu_{10} = 45.25$ |
| $r_{21} = -38.0706$ | | | |
| | $d_{21} = 1.3243$ | | |
| $r_{22} = -18.4688$ | | | |
| | $d_{22} = 1.2500$ | $n_{11} = 1.78380$ | $\nu_{11} = 26.12$ |
| $r_{23} = -68.7715$ | | | |
| | $d_{23} = 0.8112$ | | |
| $r_{24} = -754.7782$ | | | |
| | $d_{24} = 4.0000$ | $n_{12} = 1.61700$ | $\nu_{12} = 62.79$ |
| $r_{25} = -21.2998$ | | | |
| | $d_{25} = D_3$ | (variable) | |
| $r_{26} = -47.1603$ | | | |
| | $d_{26} = 3.5500$ | $n_{13} = 1.84666$ | $\nu_{13} = 23.78$ |
| $r_{27} = -22.9476$ | | | |
| | $d_{27} = 1.3024$ | | |
| $r_{28} = -19.6796$ (aspherical surface) | | | |
| | $d_{28} = 0.8500$ | $n_{14} = 1.72600$ | $\nu_{14} = 53.56$ |
| $r_{29} = 38.2560$ | | | | aspherical surface coefficient
(2nd surface)

$A_4 = 0.80884 \times 10^{-6}, A_6 = 0.39895 \times 10^{-9}$
$A_8 = 0.63256 \times 10^{-11}, A_{10} = -0.14867 \times 10^{-13}$ (11th surface)

$A_4 = -0.57668 \times 10^{-6}, A_6 = 0.62593 \times 10^{-8}$
$A_8 = 0.73608 \times 10^{-10}, A_{10} = -0.30724 \times 10^{-12}$ (28th surface)

$A_4 = 0.97270 \times 10^{-5}, A_6 = -0.40654 \times 10^{-8}$
$A_8 = -0.32428 \times 10^{-11}, A_{10} = -0.21138 \times 10^{-12}$

| f | W | S | T |
|---|---|---|---|
| $D_1$ | 3.115 | 10.595 | 20.135 |
| $D_2$ | 9.133 | 7.084 | 4.946 |
| $D_3$ | 14.660 | 5.645 | 0.005 |

Embodiment 3
$f = 24.8 \sim 78,$    F/4.6 ~ F/7.6
$2\omega = 82.2° \sim 31.0°$

|  |  |  |  |
|---|---|---|---|
| $r_1 = 83.6960$ | | | |
| | $d_1 = 1.8500$ | $n_1 = 1.83400$ | $\nu_1 = 37.16$ |
| $r_2 = 24.9700$ (aspherical surface) | | | |
| | $d_2 = 7.6270$ | | |
| $r_3 = 7327.9700$ | | | |
| | $d_3 = 4.4520$ | $n_2 = 1.59270$ | $\nu_2 = 35.29$ |
| $r_4 = -81.9800$ | | | |
| | $d_4 = 14.0330$ | | |
| $r_5 = 72.0000$ | | | |
| | $d_5 = 5.8500$ | $n_3 = 1.60300$ | $\nu_3 = 65.48$ |
| $r_6 = -42.8520$ | | | |
| | $d = D_1$ | (variable) | |
| $r_7 = -29.2728$ | | | |
| | $d_7 = 1.4500$ | $n_4 = 1.83481$ | $\nu_4 = 42.72$ |
| $r_8 = 18.5660$ | | | |
| | $d_8 = 0.5394$ | | |
| $r_9 = 21.8650$ | | | |
| | $d_9 = 4.2500$ | $n_5 = 1.80518$ | $\nu_5 = 25.43$ |
| $r_{10} = -88.3670$ | | | |
| | $d_{10} = 0.9460$ | | |
| $r_{11} = -76.8780$ | | | |
| | $d_{11} = 1.7000$ | $n_6 = 1.83481$ | $\nu_6 = 42.72$ |
| $r_{12} = 559.7850$ | | | |
| | $d_{12} = 3.3558$ | | |
| $r_{13} = 47.7630$ | | | |
| | $d_{13} = 2.2000$ | $n_7 = 1.65128$ | $\nu_7 = 38.25$ |
| $r_{14} = -38.0844$ (aspherical surface) | | | |
| | $d_{14} = 0.3630$ | | |
| $r_{15} = \infty$ (stop) | | | |
| | $d_{15} = D_2$ | (variable) | |
| $r_{16} = -70.0460$ | | | |
| | $d_{16} = 1.2500$ | $n_8 = 1.83400$ | $\nu_8 = 37.16$ |
| $r_{17} = 23.8790$ | | | |
| | $d_{17} = 4.8500$ | $n_9 = 1.50743$ | $\nu_9 = 75.95$ |
| $r_{18} = -20.6750$ | | | |
| | $d_{18} = 0.1000$ | | |

-continued

Embodiment 3
$f = 24.8 \sim 78,$    F/4.6 ~ F/7.6
$2\omega = 82.2° \sim 31.0°$

|  |  |  |  |
|---|---|---|---|
| $r_{19} = -1305.7900$ | | | |
| | $d_{19} = 3.2500$ | $n_{10} = 1.81554$ | $\nu_{10} = 44.36$ |
| $r_{20} = -25.3720$ | | | |
| | $d_{20} = 0.9606$ | | |
| $r_{21} = -17.1230$ | | | |
| | $d_{21} = 1.2500$ | $n_{11} = 1.78470$ | $\nu_{11} = 26.22$ |
| $r_{22} = -127.0630$ | | | |
| | $d_{22} = 0.1000$ | | |
| $r_{23} = 205.7550$ | | | |
| | $d_{23} = 5.5000$ | $n_{12} = 1.60300$ | $\nu_{12} = 65.48$ |
| $r_{24} = -20.9360$ | | | |
| | $d_{24} = D_3$ | (variable) | |
| $r_{25} = -66.8130$ | | | |
| | $d_{25} = 4.1500$ | $n_{13} = 1.84666$ | $\nu_{13} = 23.78$ |
| $r_{26} = -25.6190$ | | | |
| | $d_{26} = 1.8096$ | | |
| $r_{27} = -21.4414$ (aspherical surface) | | | |
| | $d_{27} = 1.8500$ | $n_{14} = 1.81554$ | $\nu_{14} = 44.36$ |
| $r_{28} = 23.5730$ | | | |
| | $d_{28} = 3.2500$ | $n_{15} = 1.80207$ | $\nu_{15} = 30.20$ |
| $r_{29} = 45.1600$ | | | | aspherical surface coefficient
(2nd surface)

$A_4 = -0.33861 \times 10^{-6}, A_6 = -0.14340 \times 10^{-8}$
$A_8 = -0.18720 \times 10^{-11}, A_{10} = -0.10144 \times 10^{-13}$ (14th surface)

$A_4 = 0.33955 \times 10^{-5}, A_6 = 0.10323 \times 10^{-7}$
$A_8 = -0.14099 \times 10^{-8}, A_{10} = 0.11055 \times 10^{-10}$ (27th surface)

$A_4 = 0.63950 \times 10^{-5}, A_6 = -0.39890 \times 10^{-7}$
$A_8 = 0.26623 \times 10^{-9}, A_{10} = -0.71277 \times 10^{-12}$

| f | W | S | T |
|---|---|---|---|
| $D_1$ | 0.980 | 8.460 | 18.000 |
| $D_2$ | 7.172 | 4.527 | 0.353 |
| $D_3$ | 14.898 | 6.006 | 0.738 |

TABLE 1

| k | SA3 | CMA3 | AST3 | DIS3 | PTZ3 |
|---|---|---|---|---|---|
| (a) Wide position | | | | | |
| 1 | 0.00000 | −0.00008 | 0.00405 | −1.56414 | 0.00672 |
| 2 | 0.00247 | −0.00147 | 0.00010 | −0.01301 | 0.06550 |
| 3 | −0.00120 | −0.01143 | −0.01210 | −0.10922 | −0.02231 |
| 4 | 0.00300 | 0.00815 | 0.02447 | 0.27188 | 0.00570 |
| 5 | −0.00200 | −0.01125 | −0.00704 | −0.10007 | −0.04628 |
| 6 | −0.00014 | 0.00738 | −0.04280 | 1.14393 | −0.02292 |
| 7 | −0.00075 | −0.01136 | −0.01913 | −0.57440 | −0.09453 |
| 8 | 0.05504 | 0.07298 | 0.01075 | 0.09977 | 0.21498 |
| 9 | −0.02229 | −0.10255 | −0.05242 | −0.27362 | −0.12601 |
| 10 | 0.00008 | 0.00372 | 0.01980 | 0.85205 | 0.03364 |
| 11 | 0.00075 | −0.01811 | 0.04846 | −1.00901 | 0.07722 |
| 12 | −0.00099 | 0.02102 | −0.04974 | 0.90732 | −0.07806 |
| 13 | 0.00000 | 0.00000 | 0.00000 | 0.00000 | 0.00000 |
| 14 | 0.00017 | −0.00537 | 0.01920 | −0.63486 | 0.04002 |
| 15 | −0.00779 | 0.04562 | −0.02968 | 0.23897 | −0.09277 |
| 16 | 0.00497 | −0.02420 | 0.03424 | −0.23662 | 0.05910 |
| 17 | −0.03177 | −0.00471 | −0.00008 | −0.00593 | −0.11989 |
| 18 | 0.00326 | −0.03682 | 0.04616 | −0.22261 | 0.01304 |
| 19 | −0.06269 | −0.13376 | −0.03171 | −0.10684 | −0.11852 |
| 20 | 0.07295 | 0.22913 | 0.07997 | 0.24251 | 0.15165 |
| 21 | 0.00007 | 0.00369 | 0.02235 | 1.55057 | 0.06310 |
| 22 | −0.00004 | −0.00269 | −0.01793 | −1.42296 | −0.05317 |
| 23 | −0.01567 | −0.04565 | −0.01477 | −0.10646 | −0.09488 |
| 24 | 0.00362 | −0.01000 | 0.00307 | −0.03230 | 0.03201 |
| 25 | −0.00853 | −0.07536 | −0.07401 | −0.51237 | −0.09989 |
| 26 | 0.00777 | 0.06423 | 0.05902 | 0.41096 | 0.09006 |
| 27 | −0.00391 | −0.01155 | −0.00379 | −0.05464 | −0.05171 |
| 28 | 0.00228 | 0.02920 | 0.03165 | 0.51721 | 0.14811 |
| 29 | −0.00050 | 0.01356 | −0.04103 | 0.36379 | 0.00094 |
| Total | −0.00455 | −0.00768 | 0.00705 | −0.38012 | −0.01915 |
| (b) Tele position | | | | | |
| 1 | 0.00000 | −0.00011 | 0.00321 | −0.68644 | 0.00494 |
| 2 | 0.00583 | −0.05513 | 0.05796 | −0.33484 | 0.04820 |
| 3 | −0.00283 | 0.01078 | −0.00456 | 0.02664 | −0.01642 |
| 4 | 0.00071 | 0.00424 | 0.00282 | 0.01397 | 0.00420 |
| 5 | −0.00471 | 0.02819 | −0.01874 | 0.10531 | −0.03406 |

TABLE 1-continued

| k | SA3 | CMA3 | AST3 | DIS3 | PTZ3 |
|---|---|---|---|---|---|
| 6 | −0.00033 | 0.01275 | −0.05429 | 0.90861 | −0.01687 |
| 7 | −0.00112 | −0.01167 | −0.01349 | −0.28813 | −0.06957 |
| 8 | 0.08740 | 0.07884 | 0.00790 | 0.04995 | 0.15820 |
| 9 | −0.03515 | −0.11024 | −0.03842 | −0.13711 | −0.09273 |
| 10 | 0.00011 | 0.00360 | 0.01342 | 0.42701 | 0.02476 |
| 11 | 0.00129 | −0.02078 | 0.03721 | −0.50529 | −0.05682 |
| 12 | −0.00168 | 0.02393 | −0.03796 | 0.45411 | −0.05745 |
| 13 | 0.00000 | 0.00000 | 0.00000 | 0.00000 | 0.00000 |
| 14 | 0.00029 | −0.00611 | 0.01419 | −0.30399 | 0.02945 |
| 15 | −0.01256 | 0.04313 | −0.01646 | 0.09697 | −0.06827 |
| 16 | 0.00799 | −0.02245 | 0.02242 | −0.09764 | 0.04349 |
| 17 | −0.05041 | −0.03204 | −0.00226 | −0.01917 | −0.08823 |
| 18 | 0.00529 | −0.03744 | 0.02948 | −0.09228 | 0.00960 |
| 19 | −0.09885 | −0.19654 | −0.04342 | −0.08658 | −0.08722 |
| 20 | 0.11476 | 0.30709 | 0.09131 | 0.18099 | 0.11160 |
| 21 | 0.00008 | 0.00327 | 0.01413 | 0.78584 | 0.04643 |
| 22 | −0.00005 | −0.00230 | −0.01101 | −0.71938 | −0.03913 |
| 23 | −0.02462 | −0.06204 | −0.01737 | −0.07324 | −0.06982 |
| 24 | 0.01001 | −0.01545 | 0.00265 | −0.01349 | 0.02356 |
| 25 | −0.03782 | −0.16694 | −0.08186 | −0.22857 | −0.07351 |
| 26 | 0.03406 | 0.14164 | 0.06545 | 0.18260 | 0.06628 |
| 27 | −0.01456 | −0.02337 | −0.00417 | −0.02259 | −0.03805 |
| 28 | 0.01464 | 0.08096 | 0.02915 | 0.09926 | 0.10900 |
| 29 | −0.00069 | 0.01591 | −0.04079 | 0.30838 | 0.00069 |
| Total | −0.01662 | −0.04671 | 0.03664 | 0.17452 | −0.07964 |

TABLE 2

| d | Δf | ΔBf | ΔSA | ΔM |
|---|---|---|---|---|
| (a) Wide position | | | | |
| 1 | −0.00002 | −0.00029 | 0.00000 | 0.00001 |
| 2 | −0.00339 | −0.00641 | −0.00001 | −0.00090 |
| 3 | −0.00099 | −0.00253 | −0.00001 | 0.00023 |
| 4 | −0.00199 | −0.00467 | −0.00001 | −0.00021 |
| 5 | −0.00002 | −0.00030 | 0.00000 | 0.00099 |
| 6 | −0.00020 | 0.00098 | 0.00001 | 0.00077 |
| 7 | −0.00597 | −0.00010 | 0.00006 | 0.00243 |
| 8 | −0.00855 | −0.01497 | −0.00130 | −0.00259 |
| 9 | −0.00047 | 0.00090 | 0.00018 | 0.00308 |
| 10 | −0.00001 | −0.00024 | −0.00006 | 0.00505 |
| 11 | −0.00305 | −0.00644 | −0.00047 | 0.00395 |
| 12 | 0.00000 | −0.00001 | −0.00002 | 0.00445 |
| 13 | 0.00000 | −0.00001 | −0.00002 | 0.00391 |
| 14 | −0.00076 | −0.00266 | −0.00027 | 0.00336 |
| 15 | −0.00222 | 0.00097 | 0.00036 | 0.00072 |
| 16 | 0.00000 | −0.00004 | −0.00002 | 0.00282 |
| 17 | −0.00928 | −0.00442 | 0.00002 | 0.00335 |
| 18 | −0.00408 | −0.00145 | 0.00003 | 0.00280 |
| 19 | −0.03571 | −0.03274 | −0.00213 | 0.00248 |
| 20 | −0.00258 | −0.00005 | 0.00017 | −0.00049 |
| 21 | −0.00026 | 0.00113 | 0.00007 | −0.00747 |
| 22 | −0.00194 | 0.00045 | 0.00016 | −0.00090 |
| 23 | −0.01470 | −0.01098 | 0.00004 | 0.00266 |
| 24 | −0.00588 | −0.00320 | 0.00005 | 0.00144 |
| 25 | −0.02248 | −0.02376 | −0.00020 | −0.00273 |
| 26 | −0.00649 | −0.00400 | 0.00004 | 0.00144 |
| 27 | −0.01727 | −0.01563 | −0.00004 | 0.00194 |
| 28 | −0.00547 | −0.00004 | 0.00001 | 0.00197 |
| (b) Tele position | | | | |
| 1 | −0.00004 | −0.00045 | 0.00000 | 0.00000 |
| 2 | −0.00784 | −0.00924 | −0.00006 | −0.00600 |
| 3 | −0.00228 | −0.00370 | −0.00002 | −0.00109 |
| 4 | −0.00462 | −0.00681 | −0.00004 | −0.00283 |
| 5 | −0.00005 | −0.00045 | 0.00000 | 0.00077 |
| 6 | −0.00045 | 0.00152 | 0.00000 | −0.00018 |
| 7 | −0.01176 | −0.00265 | −0.00001 | 0.00107 |
| 8 | −0.01589 | −0.02550 | −0.00316 | −0.00521 |
| 9 | −0.00099 | 0.00121 | 0.00043 | 0.00306 |
| 10 | 0.00000 | −0.00018 | −0.00011 | 0.00491 |
| 11 | −0.00560 | −0.01065 | −0.00112 | 0.00360 |
| 12 | 0.00000 | 0.00014 | −0.00003 | 0.00427 |
| 13 | 0.00000 | 0.00014 | −0.00003 | 0.00373 |
| 14 | −0.00133 | −0.00412 | −0.00063 | 0.00329 |
| 15 | −0.00444 | 0.00044 | 0.00081 | 0.00013 |
| 16 | 0.00000 | 0.00005 | −0.00003 | 0.00251 |
| 17 | −0.01798 | −0.01091 | −0.00022 | 0.00298 |
| 18 | −0.00794 | −0.00406 | −0.00006 | 0.00293 |
| 19 | −0.06818 | −0.06514 | −0.00606 | −0.00323 |
| 20 | −0.00507 | −0.00128 | 0.00034 | −0.00092 |

TABLE 2-continued

| d | Δf | ΔBf | ΔSA | ΔM |
|---|---|---|---|---|
| 21 | −0.00059 | 0.00171 | 0.00017 | −0.00653 |
| 22 | −0.00386 | −0.00023 | 0.00031 | −0.00128 |
| 23 | −0.02823 | −0.02317 | −0.00028 | 0.00201 |
| 24 | −0.00965 | −0.00623 | 0.00002 | 0.00133 |
| 25 | −0.05372 | −0.05590 | −0.00219 | −0.00528 |
| 26 | −0.01128 | −0.00803 | −0.00009 | 0.00140 |
| 27 | −0.03718 | −0.03489 | −0.00086 | 0.00109 |
| 28 | −0.00551 | −0.00006 | 0.00001 | 0.00105 | wherein the reference symbols $r_1$, $r_2$, ... represent the radii of curvature on the surfaces of the respective lens elements, the reference symbols $d_1$, $d_2$, designate the thicknesses of the respective lens elements and the airspaces reserved therebetween, the reference symbols $n_1$, $n_2$, ... denote the refractive indices of the respective lens elements, and the reference symbols $\nu_1$, $\nu_2$, ... represent the Abbe's numbers of the respective lens elements.

The Table 1 lists the aberration coefficients of the third order for the Embodiment 1. In this table, the reference symbols SA3, CMA3, AST3, DIS3 and PTZ3 represent the spherical aberration of the third order, coma of the third order, astigmatism of the third order, distortion of the third order and Petzval's sum respectively.

The Table 2 lists the correction coefficients for the Embodiment 1. In this table, the reference symbol d represents the number of the airspaces, the reference symbols Δf, ΔBf, ΔSA and ΔM designate the variations of the focal length of the zoom lens system as a whole, the back focal length of the zoom lens system as a whole, zonal spherical aberration and astigmatism (meridional) respectively to be caused by widening each of the air-spaces for 0.01 mm.

The zoom lens system preferred as the Embodiment 1 has the composition illustrated in FIG. 1, comprises the first lens unit which is large, covers a field angle larger than a super wide field angle ($2\omega = 90°$) and is not suited for focusing by moving the first lens unit. Further, when the rear focusing method is adopted for the Embodiment 1, the exit pupil of the zoom lens system will be brought close to the image surface by moving the fourth lens unit toward the image side, whereby the offaxial ray emerging from the zoom lens system will have a large angle relative to the optical axis and the fourth lens unit will have a large diameter. Accordingly, the rear focusing method is not suited for the Embodiment 1. It is the most effective for focusing the Embodiment 1 to move the second lens unit and the third lens unit integrally.

Figure 4:
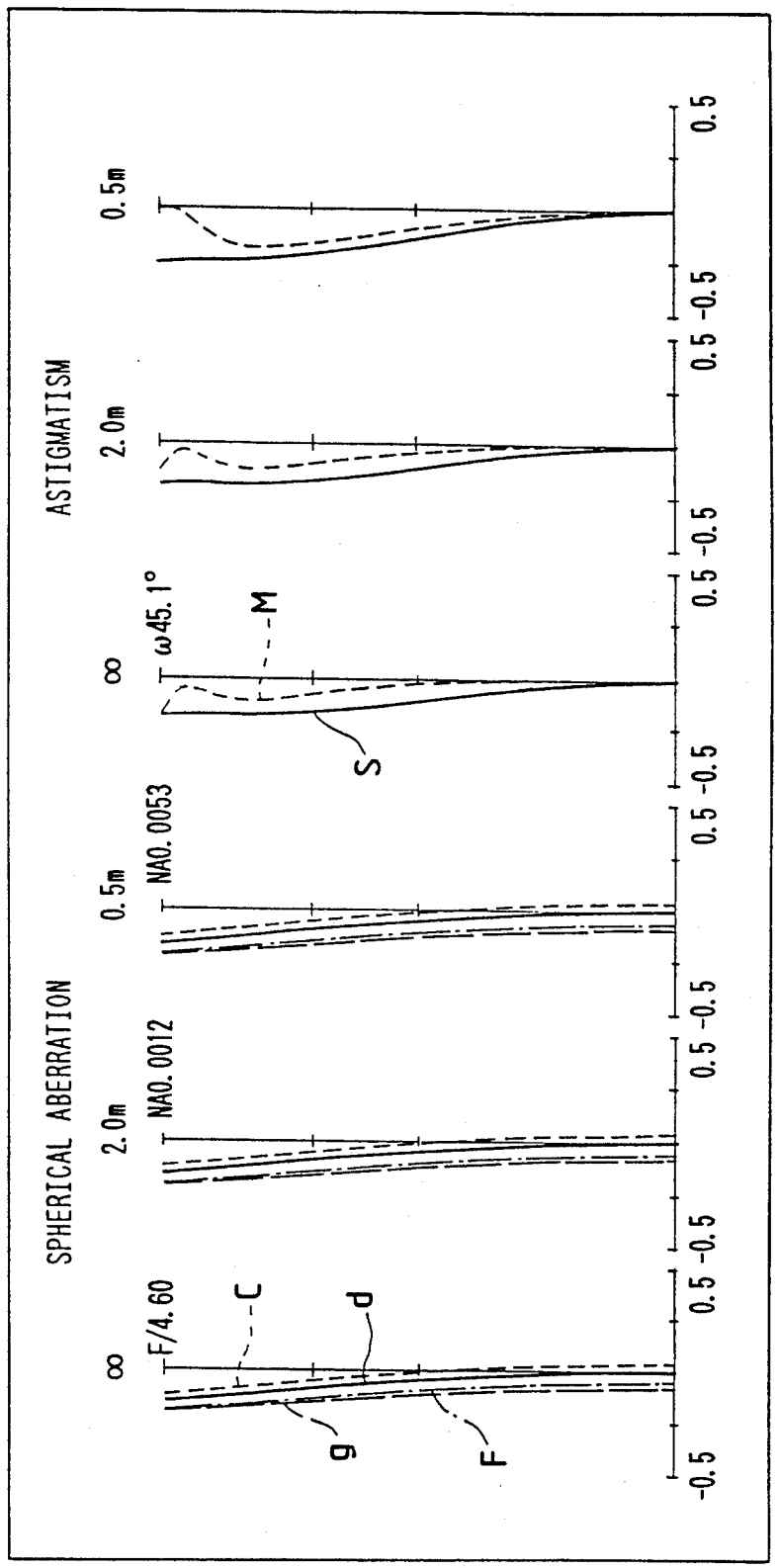
FIG. 4 through FIG. 8 show graphs illustrating aberration characteristics of the Embodiment 1 of the present invention.
Figure 5:
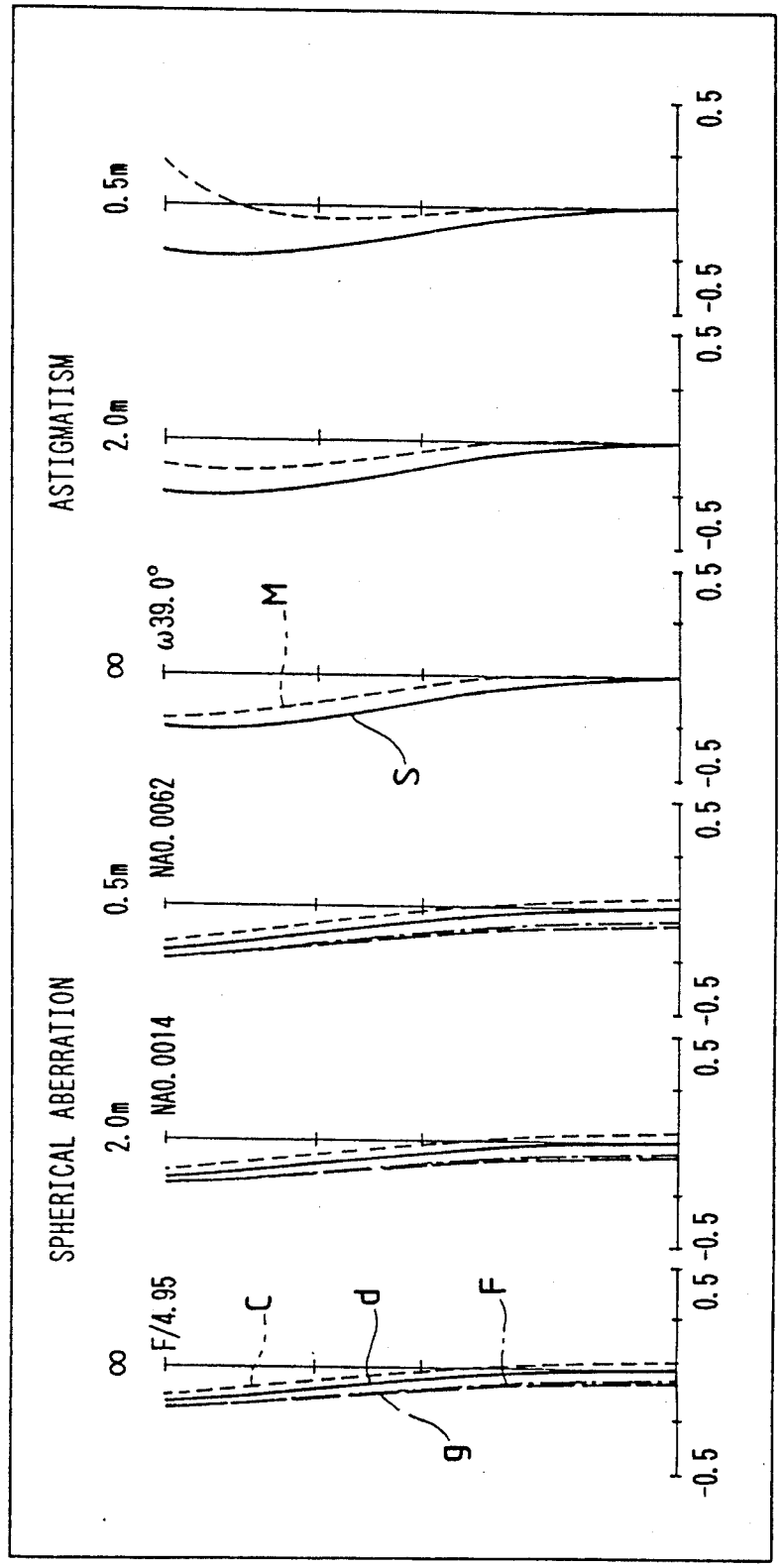
Figure 6:
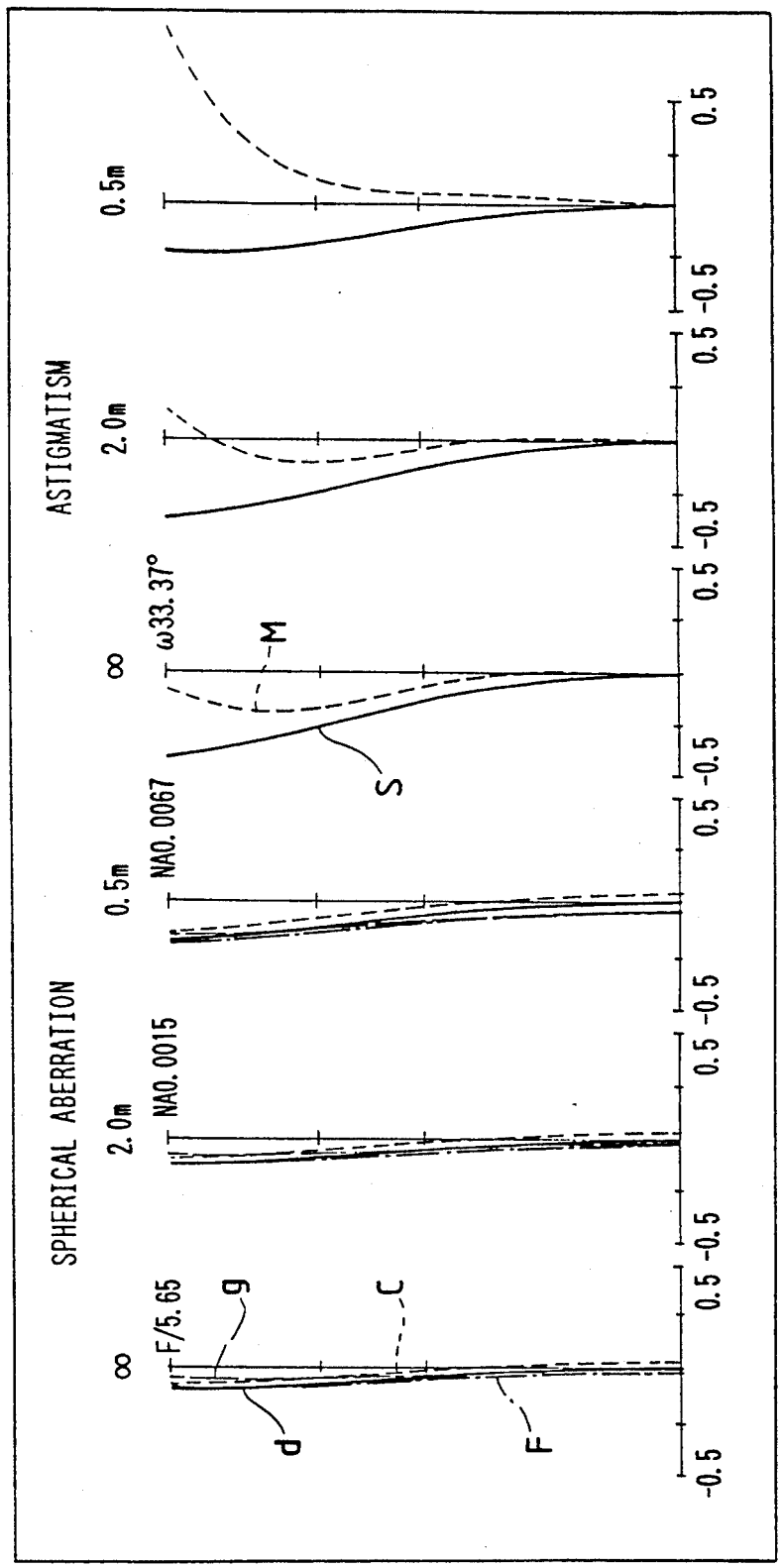
Figure 7:
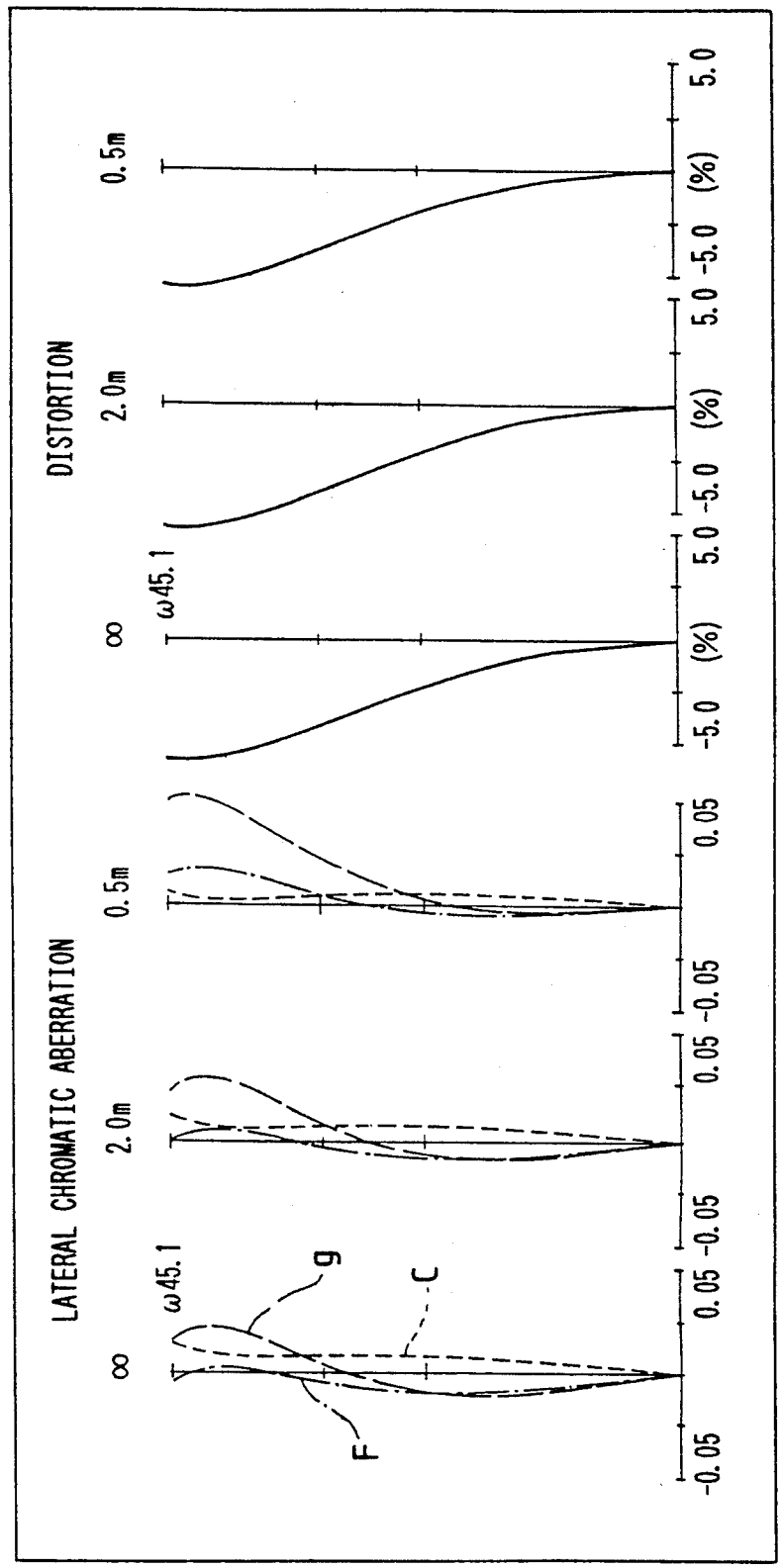
Figure 8:
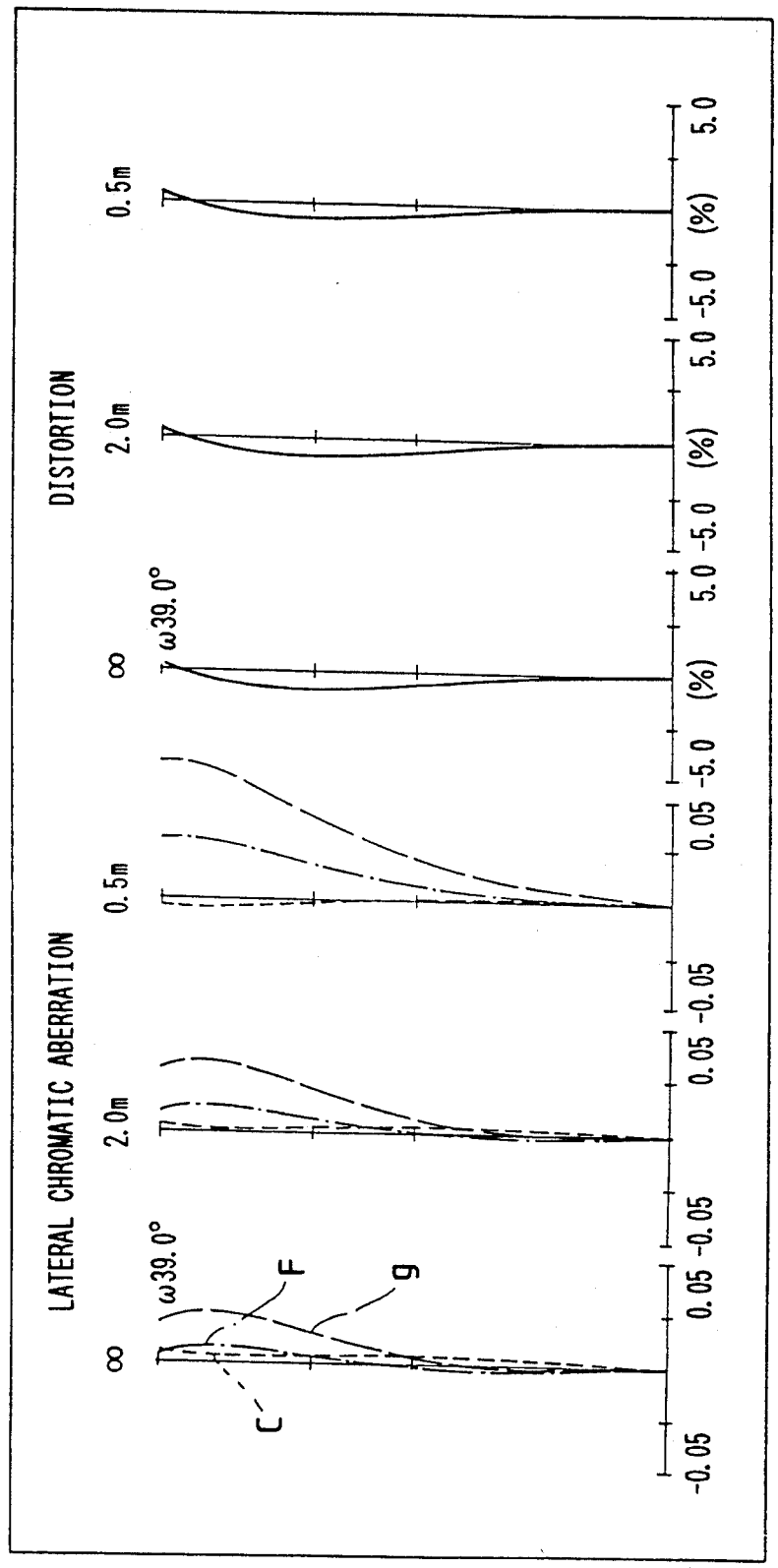
Figure 9:
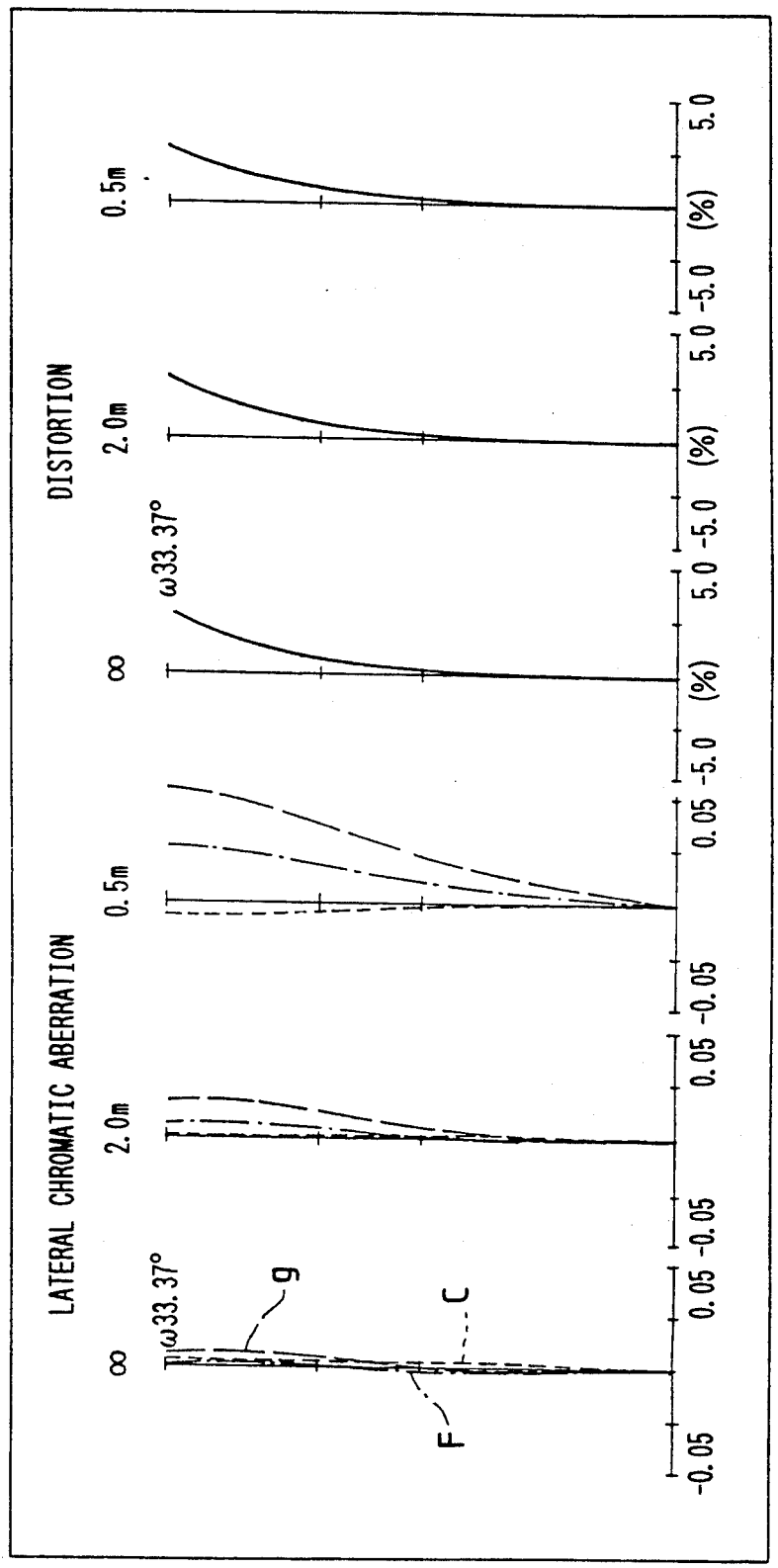
FIG. 9 through FIG. 21 show curves illustrating aberration characteristics of the Embodiment 2 of the present invention.

In conditions where the zoom lens system preferred as the Embodiment 1 is focused on an object located at infinite distance, at an object distance of 2 m and at a distance of 0.5 m by moving the second lens unit and the third lens unit, the lens system has the spherical aberration and astigmatism illustrated in FIG. 4 through FIG. 6 respectively, and lateral chromatic aberration and distortion shown in FIG. 7 through FIG. 9 respectively. Out of these drawings, FIG. 5 and FIG. 7 show the aberrations at the wide position, FIG. 5 and FIG. 8 illustrate the aberrations at the intermediate focal length, and FIG. 6 and FIG. 9 visualize the aberrations at the tele position.

As is seen from the Table 2 presented above, the spherical aberration is varied very little or stable in the airspaces $d_2$ and $d_{24}$. The Embodiment 1 can be focused on an object located at a distance of 0.1 m. Though the astigmatism and lateral chromatic aberration are varied a little or rather overcorrected in the vicinity of the tele position, both the aberrations are varied in the same direction, thereby posing nearly no problem. The Embodiment 1 has the outstandingly short object distance of 0.5 m among the zoom lens systems of the similar type. In addition, distortion is varied very little or stable in the Embodiment 1.

The Embodiment 2 is designed as a wide-angle zoom lens system which has a field angle of $2\omega=74°$ at the wide position, a field angle of $2\omega=23.9°$ at the tele position and a vari-focal ratio as high as 3.6. Further, the Embodiment 2 is designed so as to permit photographing an object located at a shortest distance of 1 m.

Figure 10:
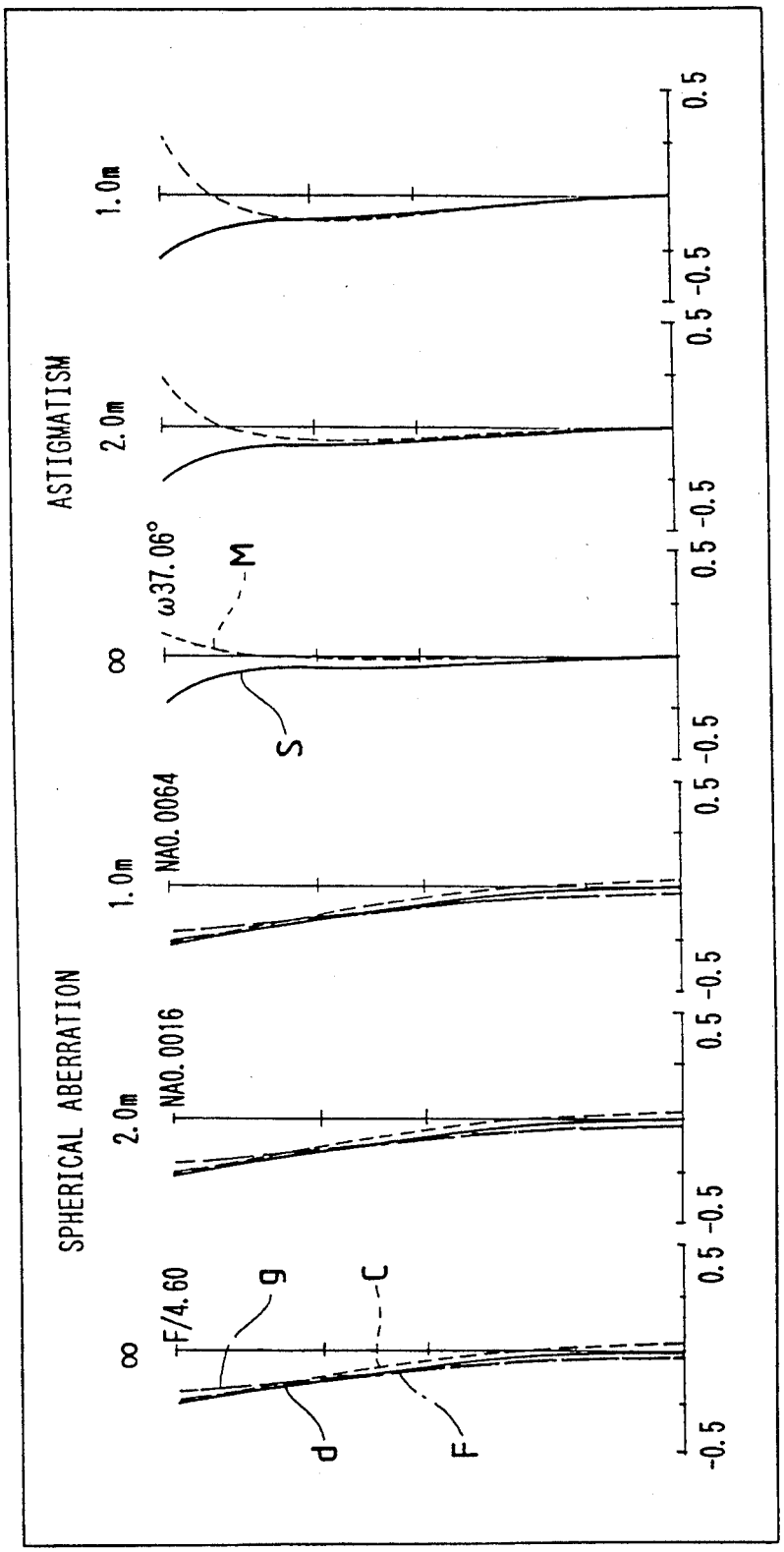
Figure 11:
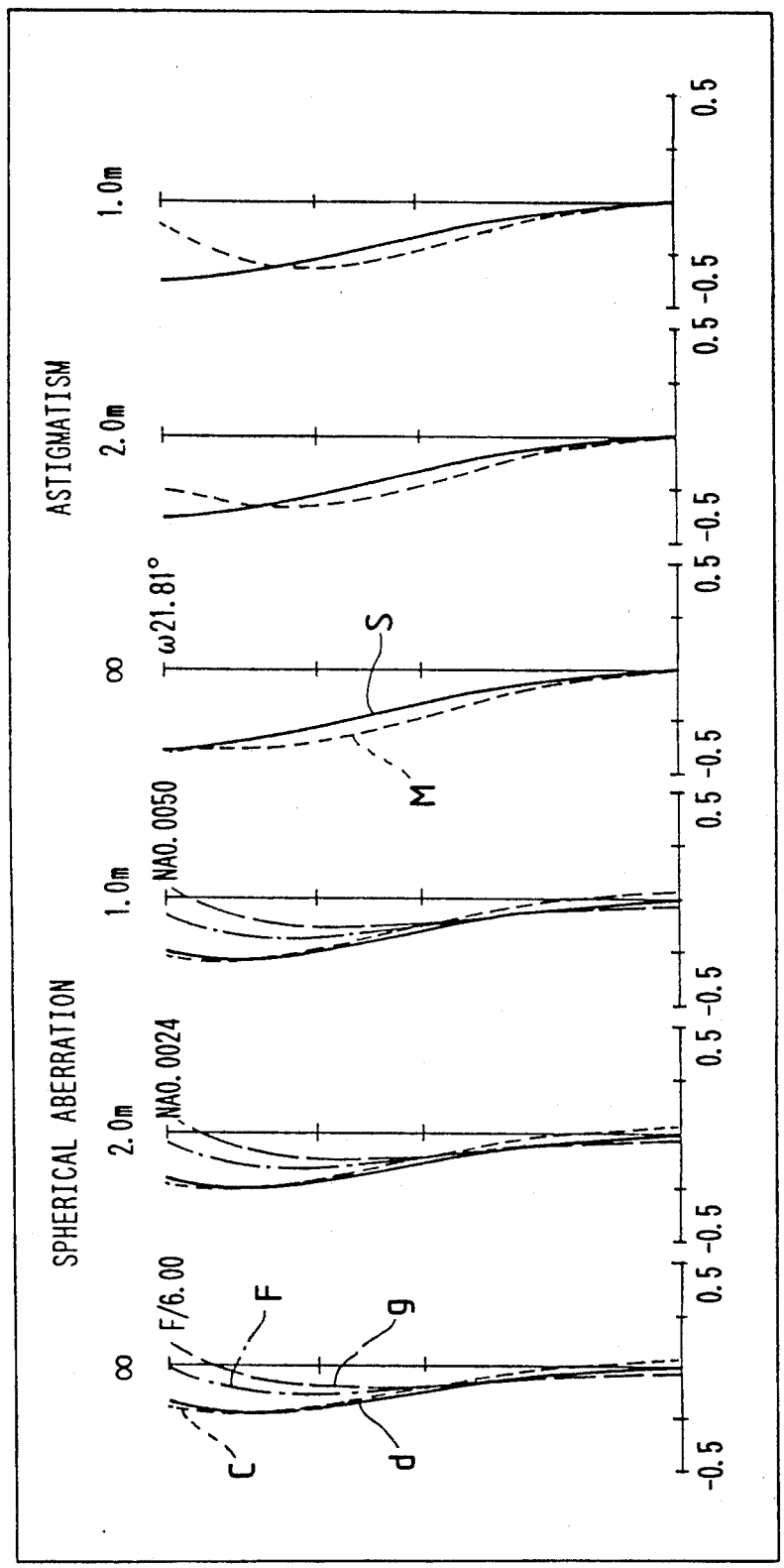
Figure 12:
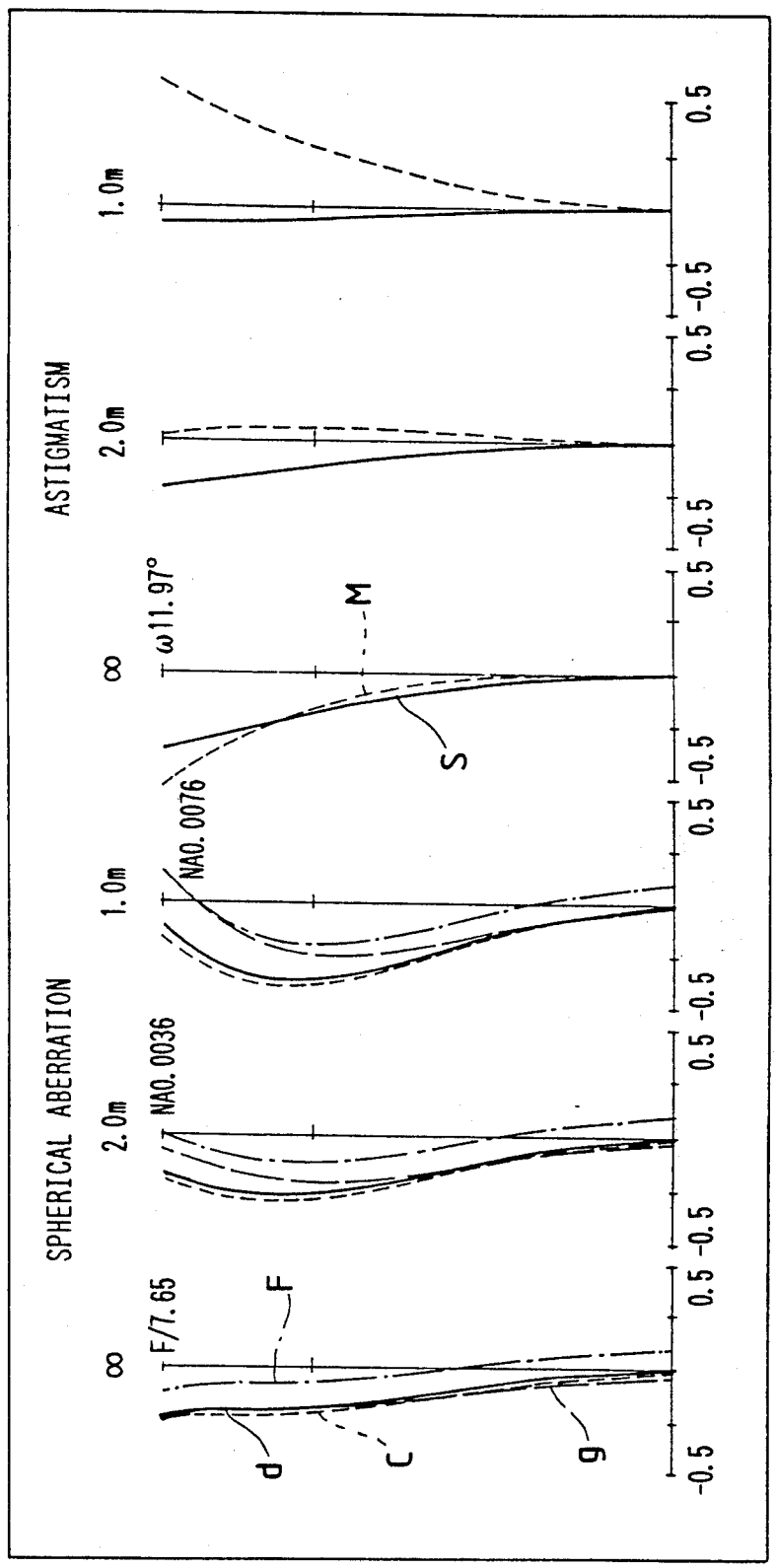
Figure 13:
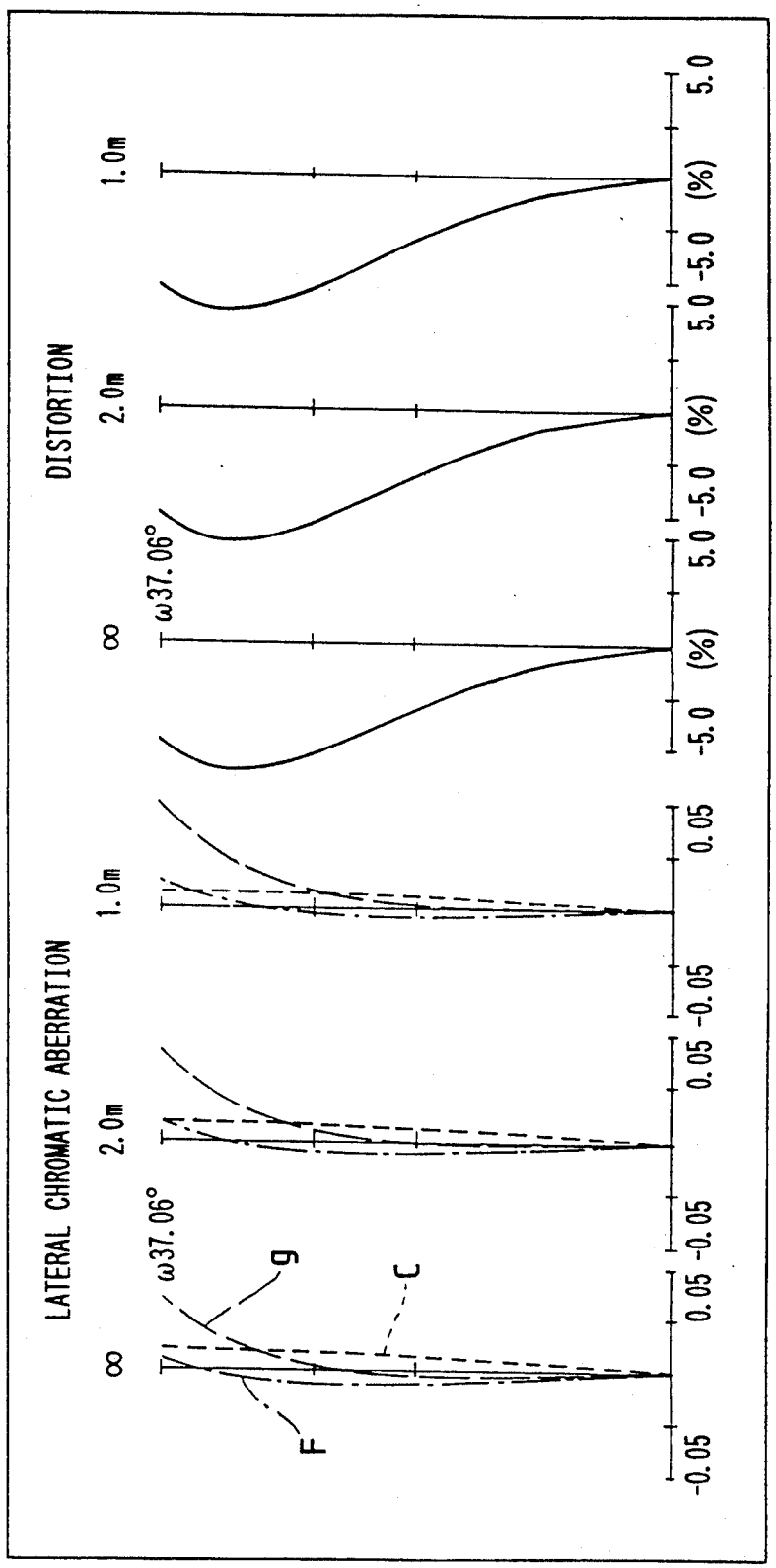
Figure 14:
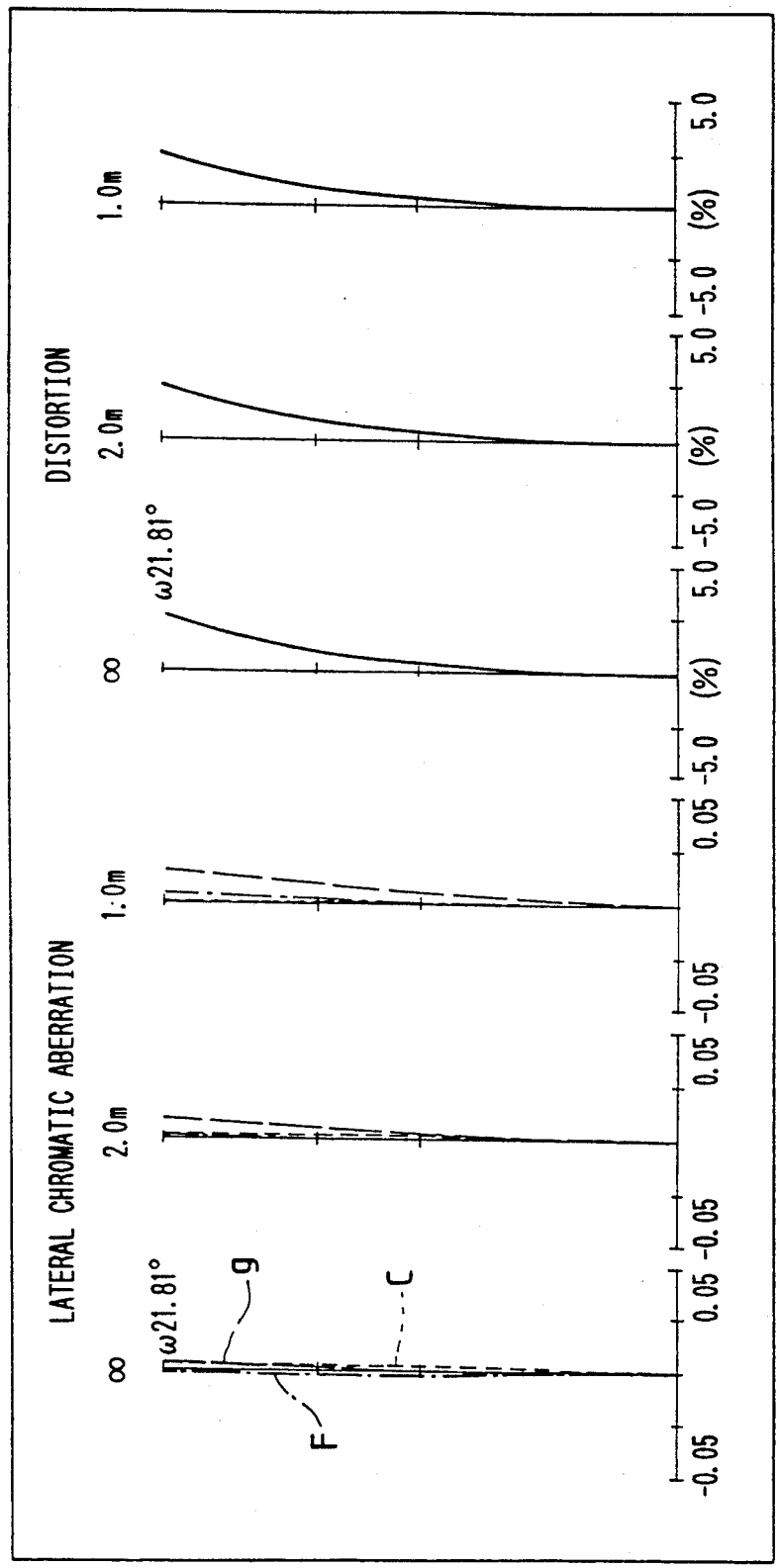
Figure 15:
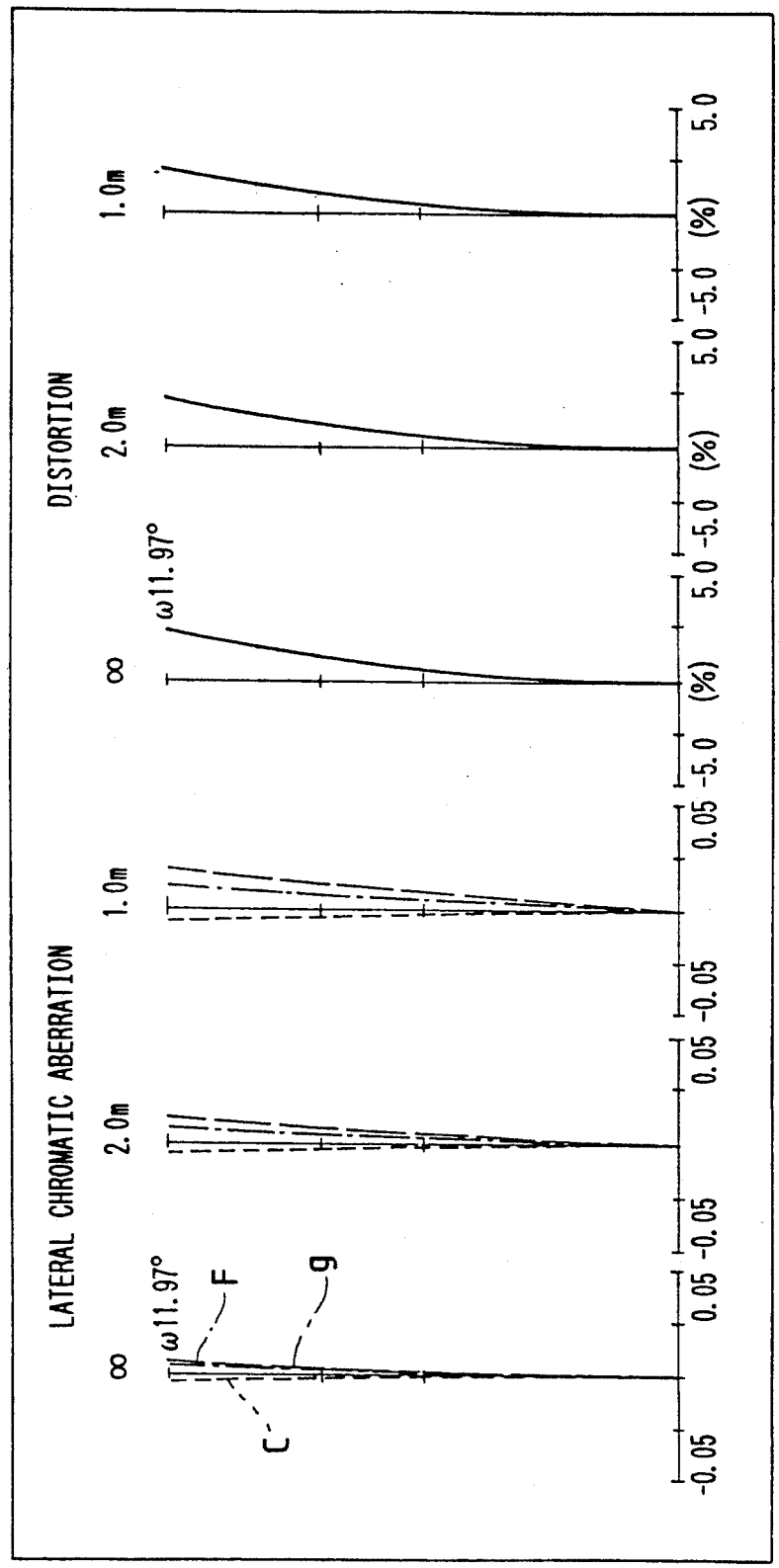
Figure 16:
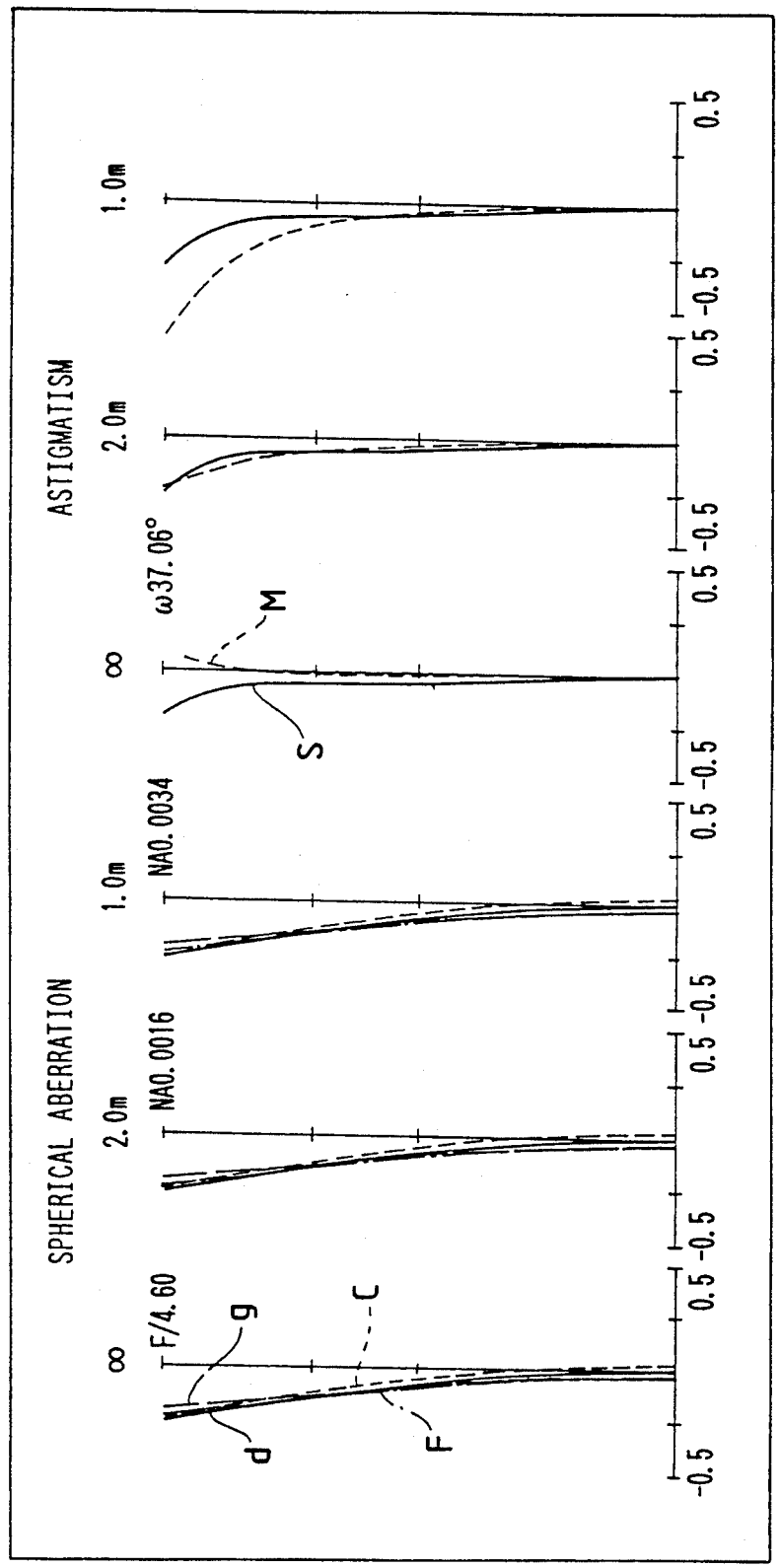
Figure 17:
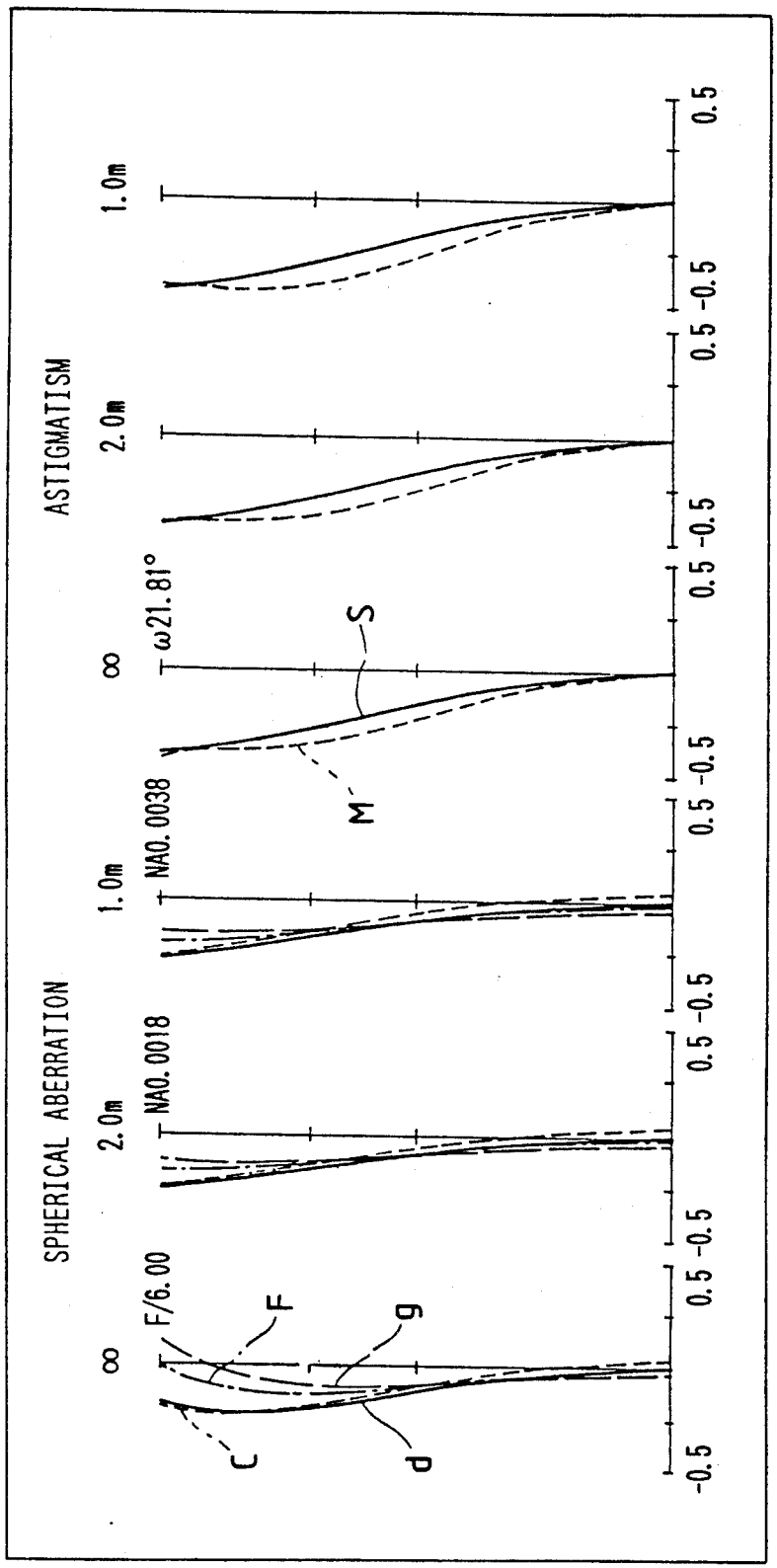
Figure 18:
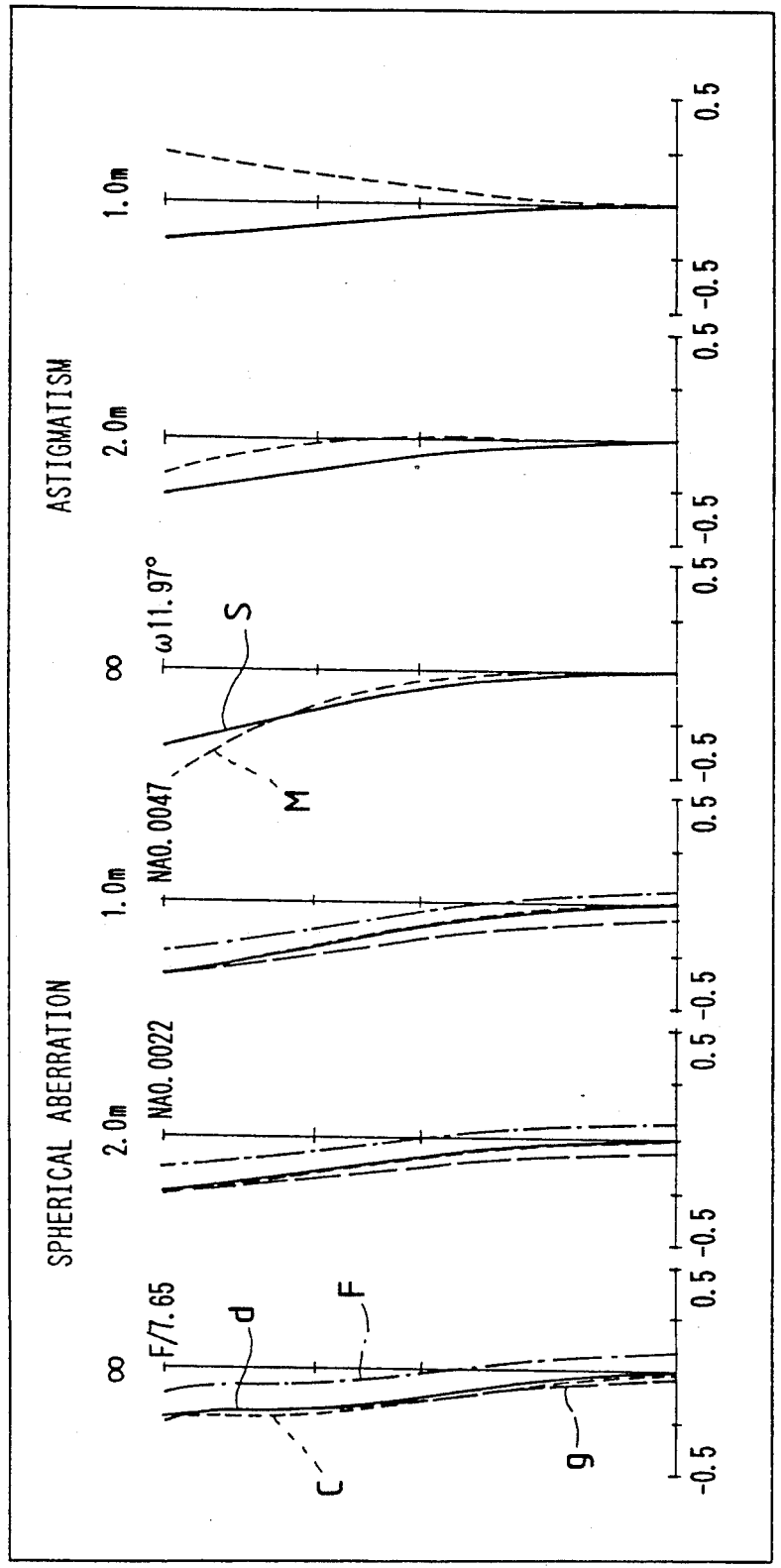
Figure 19:
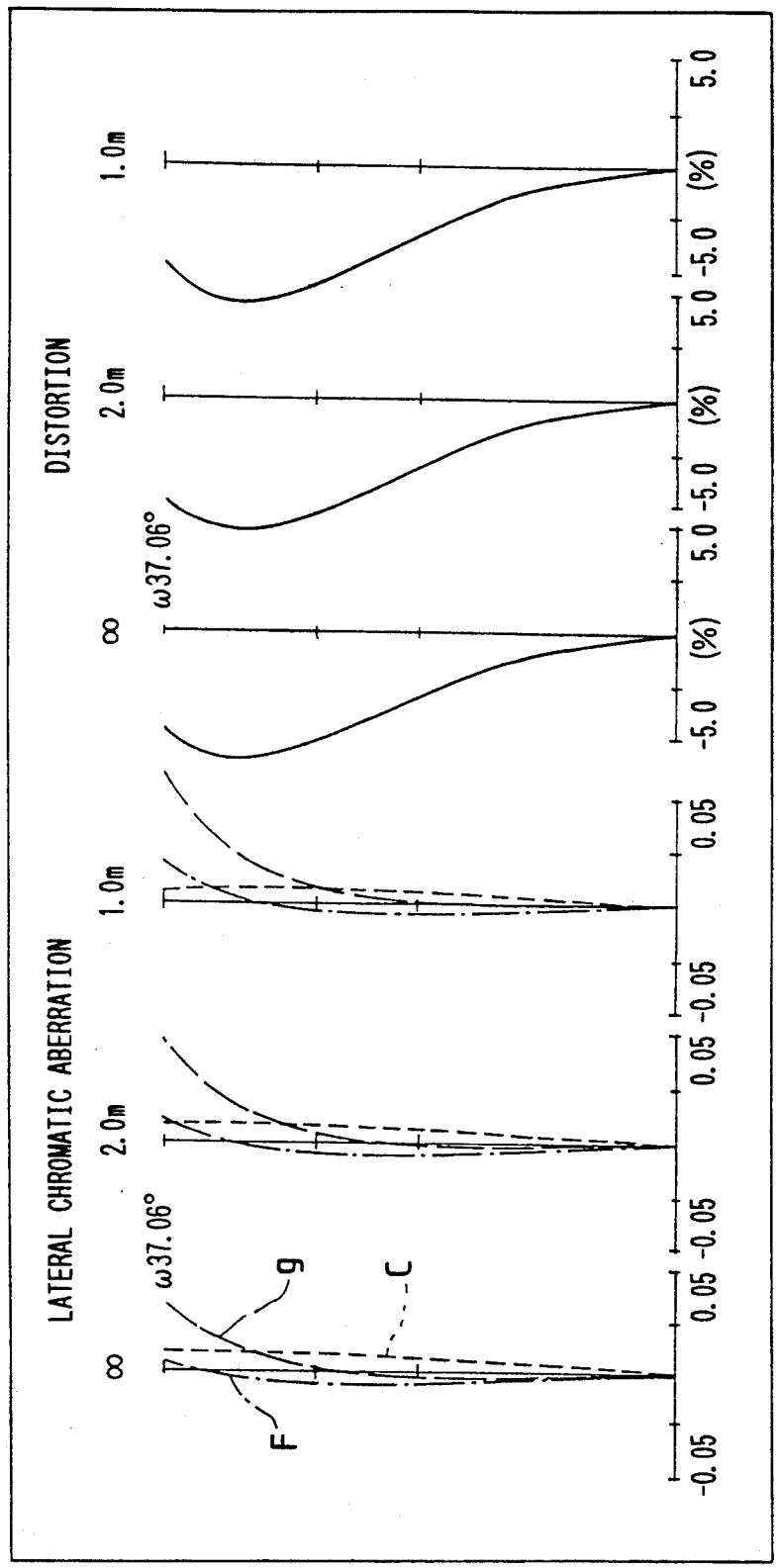
Figure 20:
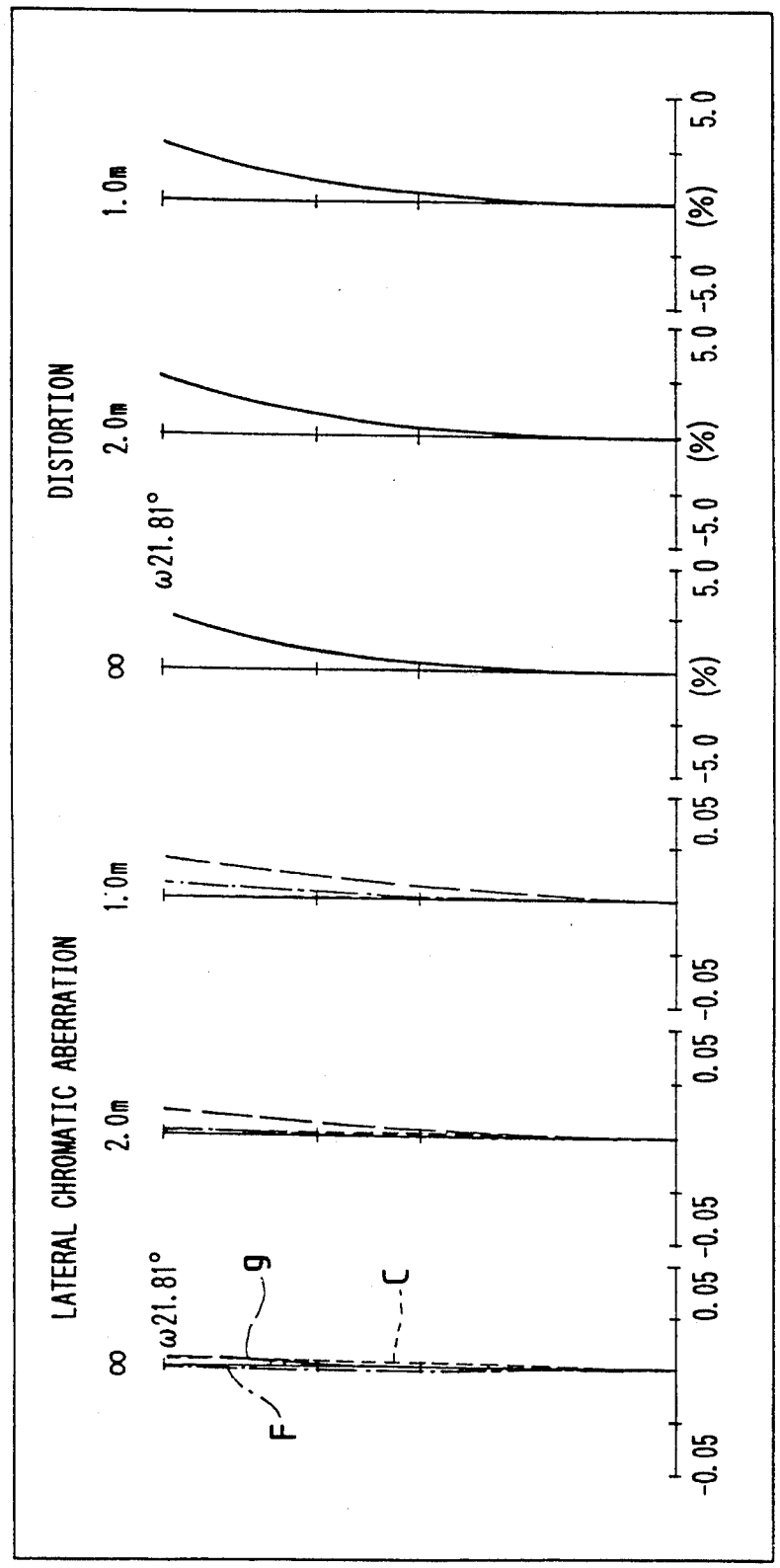
Figure 21:
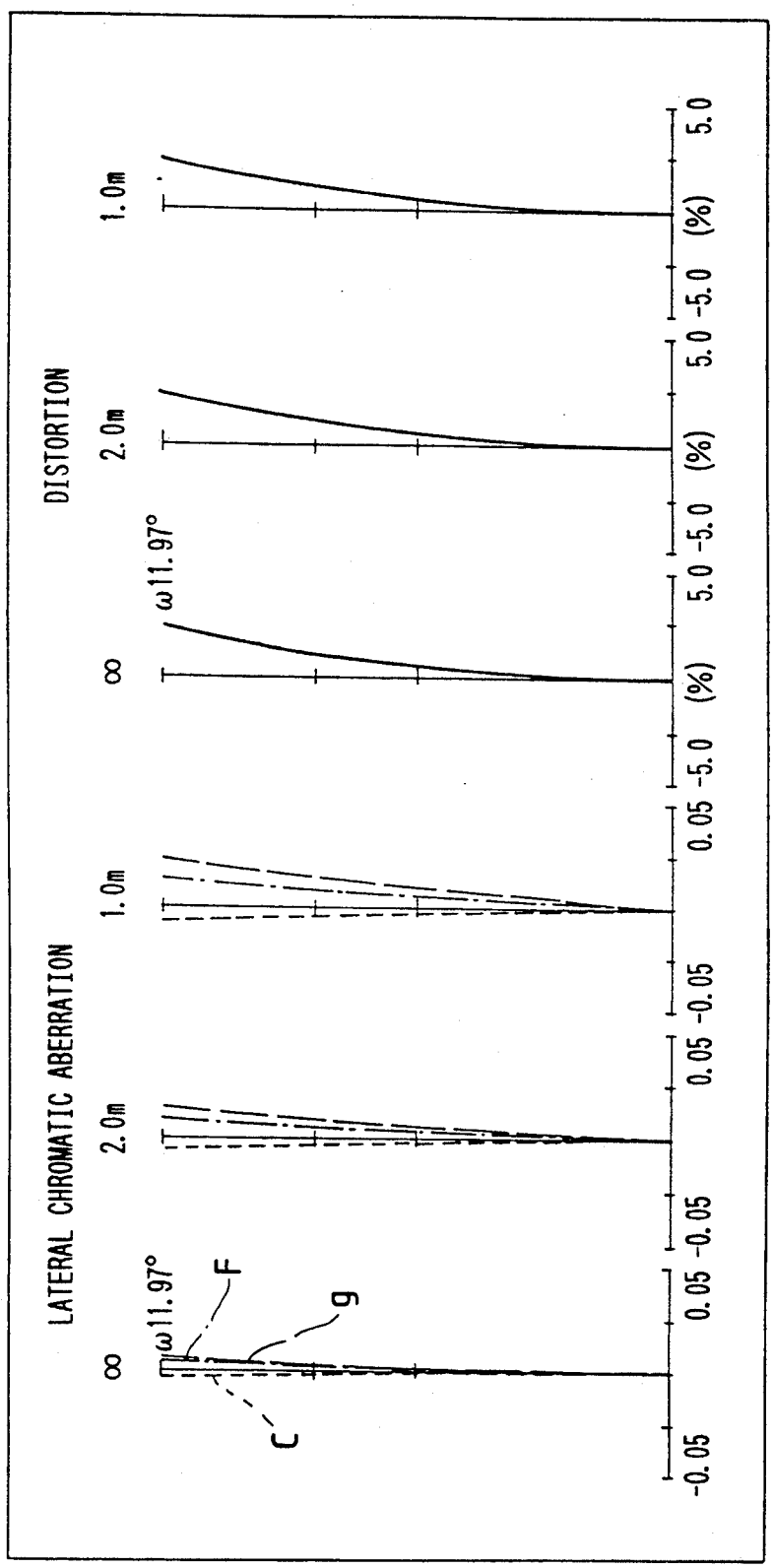

Aberration characteristics of the Embodiment 2 are illustrated in FIG. 10 through FIG. 21. Out of these drawings, FIG. 10 through FIG. 15 show aberrations of the Embodiment 2 when it is focused by moving the second lens unit and the third lens unit, whereas FIG. 16 through FIG. 21 visualize aberrations when the zoom lens system is focused by moving the fourth lens unit. Speaking more concretely, FIG. 10 through FIG. 12 show the spherical aberration and astigmatism at the wide position, intermediate focal length and tele position respectively of the Embodiment 2 when it is focused on an object located at a distance of 1 m by moving the second lens unit and the third lens unit, and FIG. 13 through FIG. 15 visualize the lateral chromatic aberration and distortion at the wide position, intermediate focal length and tele position respectively of the Embodiment 2 when it is focused on an object located at the distance of 1 m by moving the second lens unit and the third lens unit. Further, FIG. 16 through FIG. 18 illustrate the spherical aberration and astigmatism at the wide position, intermediate focal length and tele position respectively of the Embodiment 2 when it is focused on an object located at said distance of 1 m by moving the fourth lens unit, whereas FIG. 19 through FIG. 21 show the lateral chromatic aberration and distortion at the wide position, intermediate focal length and tele position respectively when the zoom lens system is focused on an object located at said distance of 1 m by moving the fourth lens unit. As is clarified by these aberration curves, the aberrations are varied little in the zoom lens system preferred as the Embodiment 2 in both of the case where the lens system is focused by moving the second lens unit and the third lens unit integrally, and the case where the lens system is focused by moving the fourth lens unit. That is to say, the Embodiment 2 has very stable optical performance though it allows the meridional image surface to be a little overcorrected in the vicinity of the tele position.

The Embodiment 3 is designed as a zoom lens system having a field angle exceeding a super wide angle of $2\omega=82°$ at the wide position, a field angle of $2\omega=31°$ at the tele position and a vari-focal ratio covering a zooming range including the field angle at the tele position which is used frequently.

Figure 22:
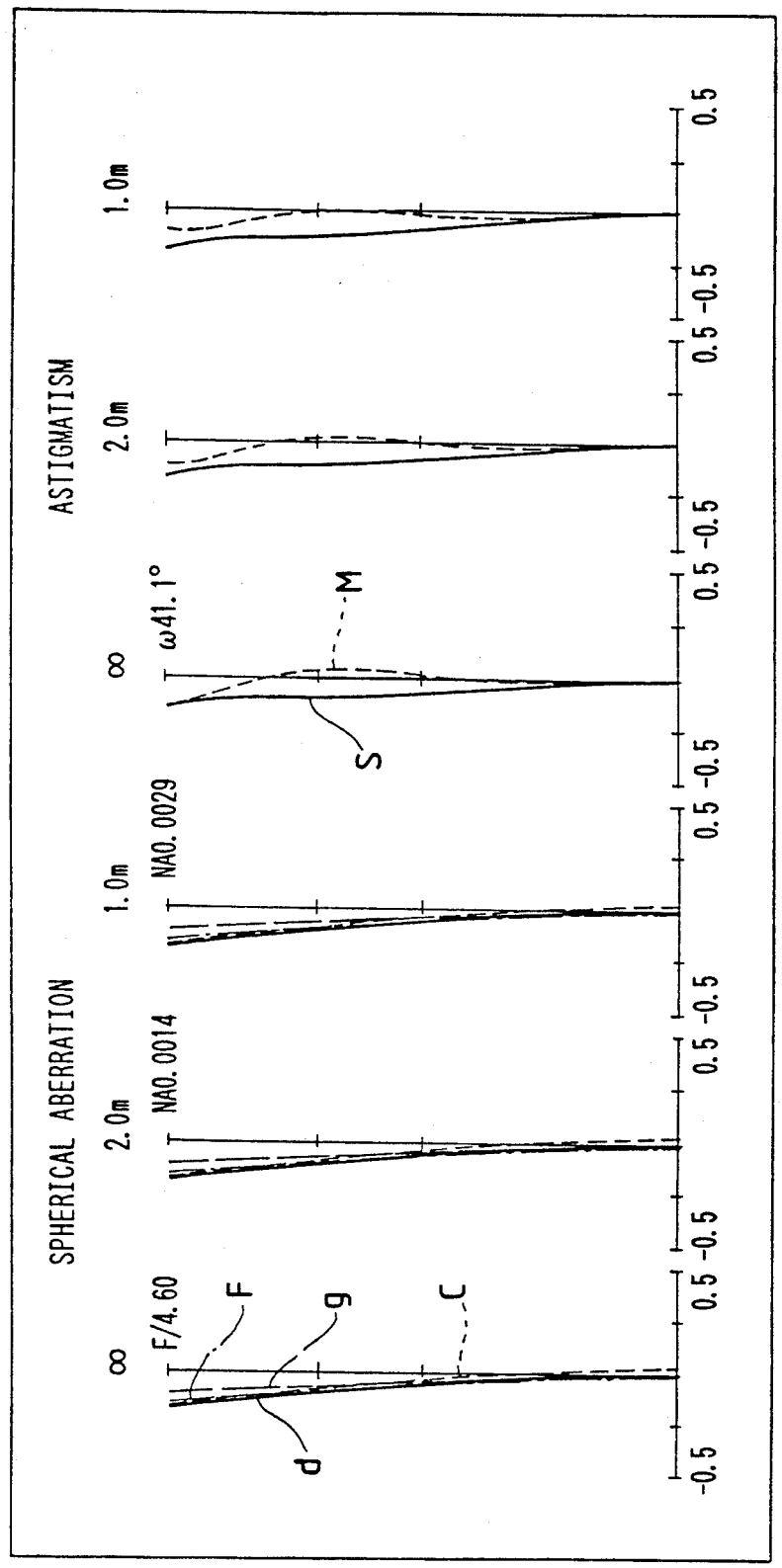
FIG. 22 through FIG. 27 show graphs visualizing aberration characteristics of the Embodiment 3 of the present invention.
Figure 23:
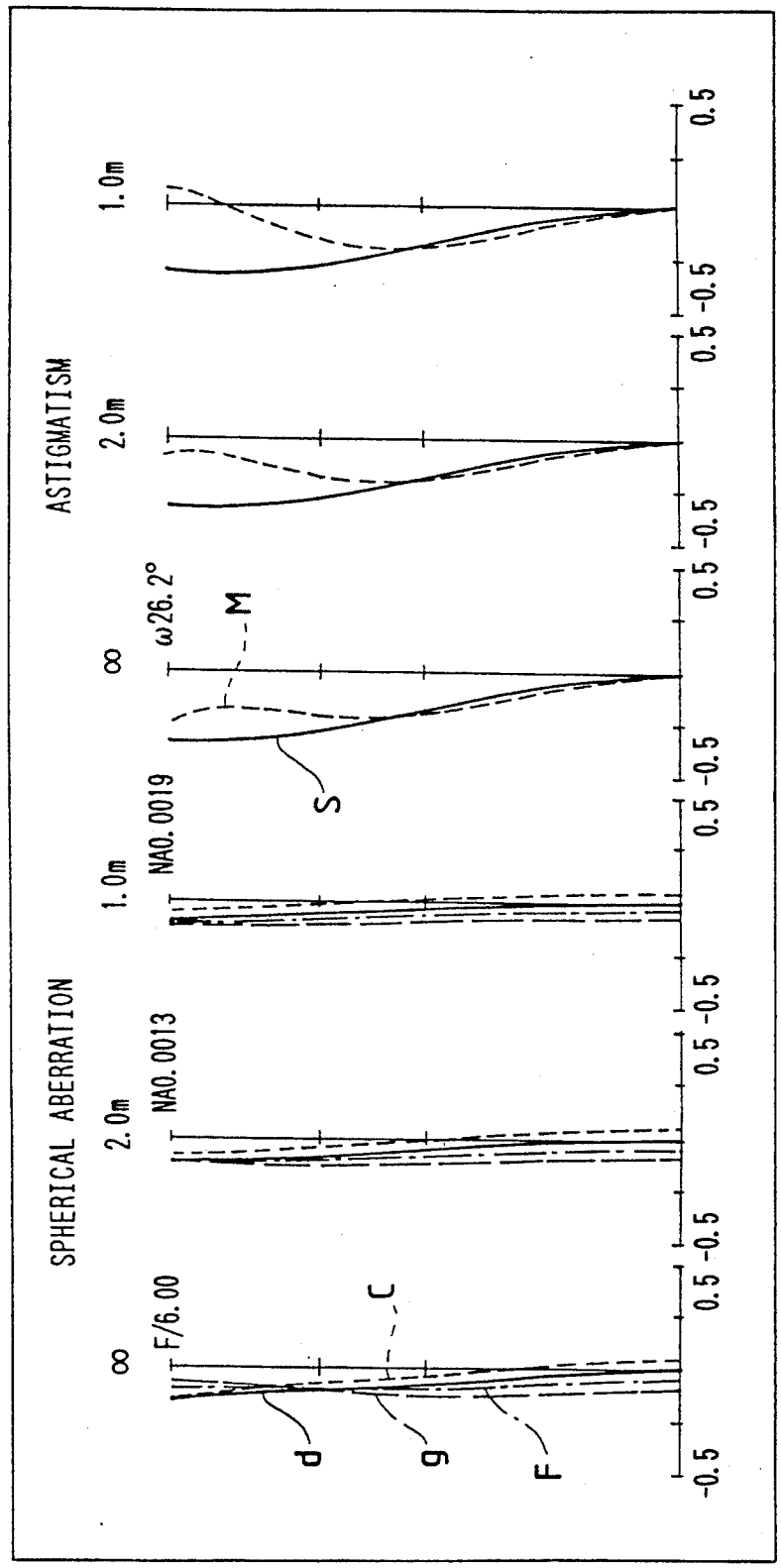
Figure 24:
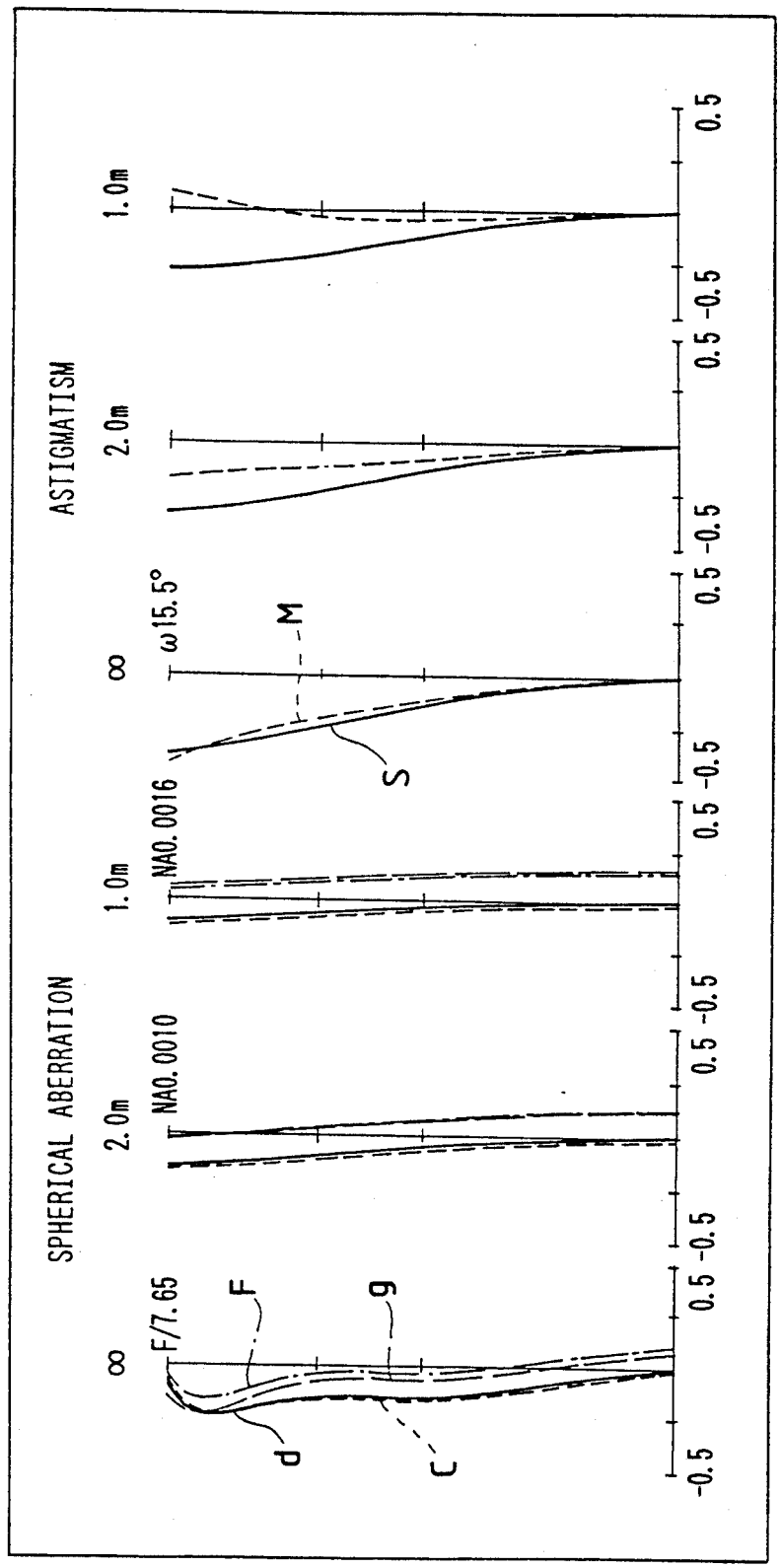
Figure 25:
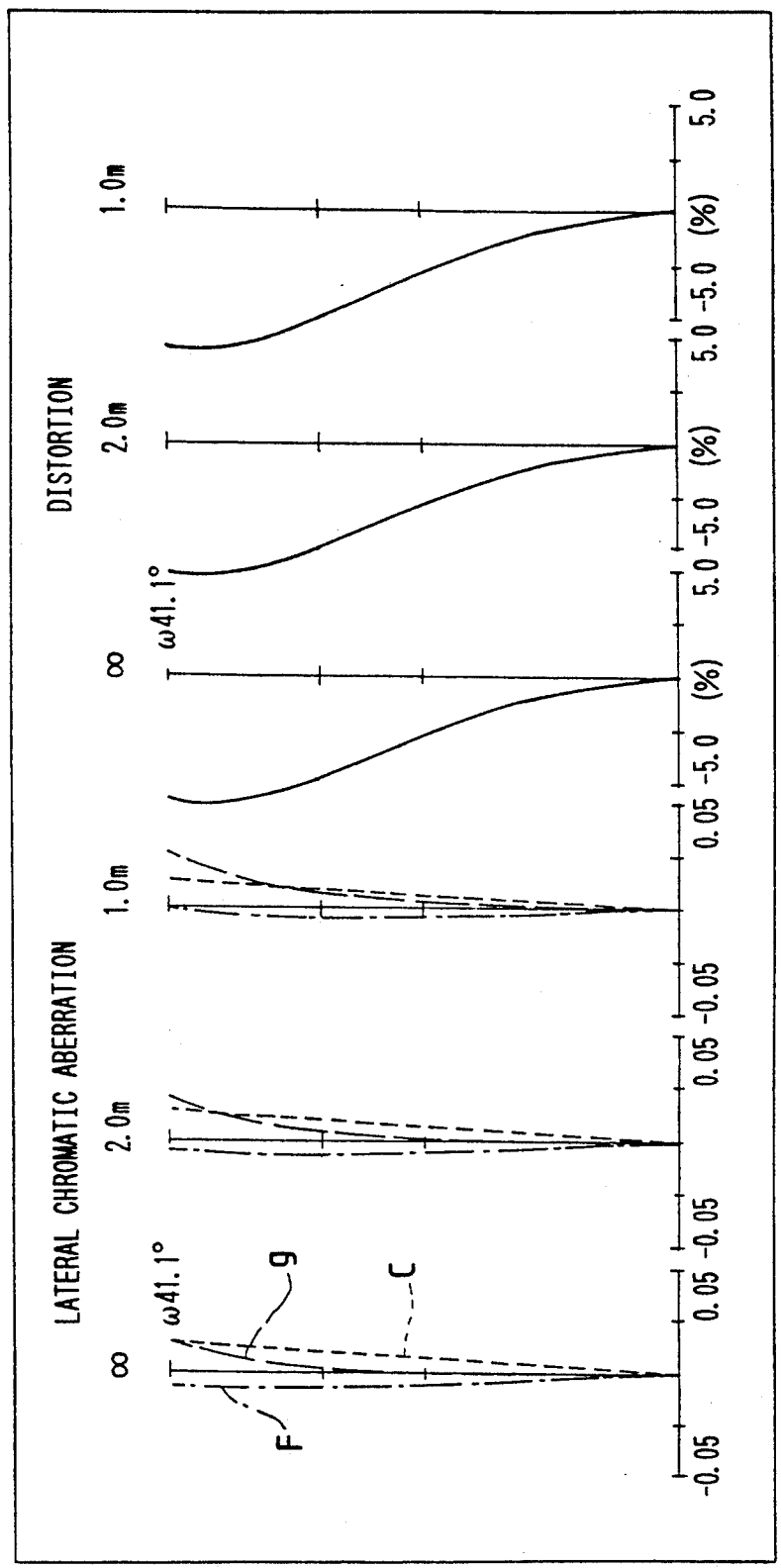
Figure 26:
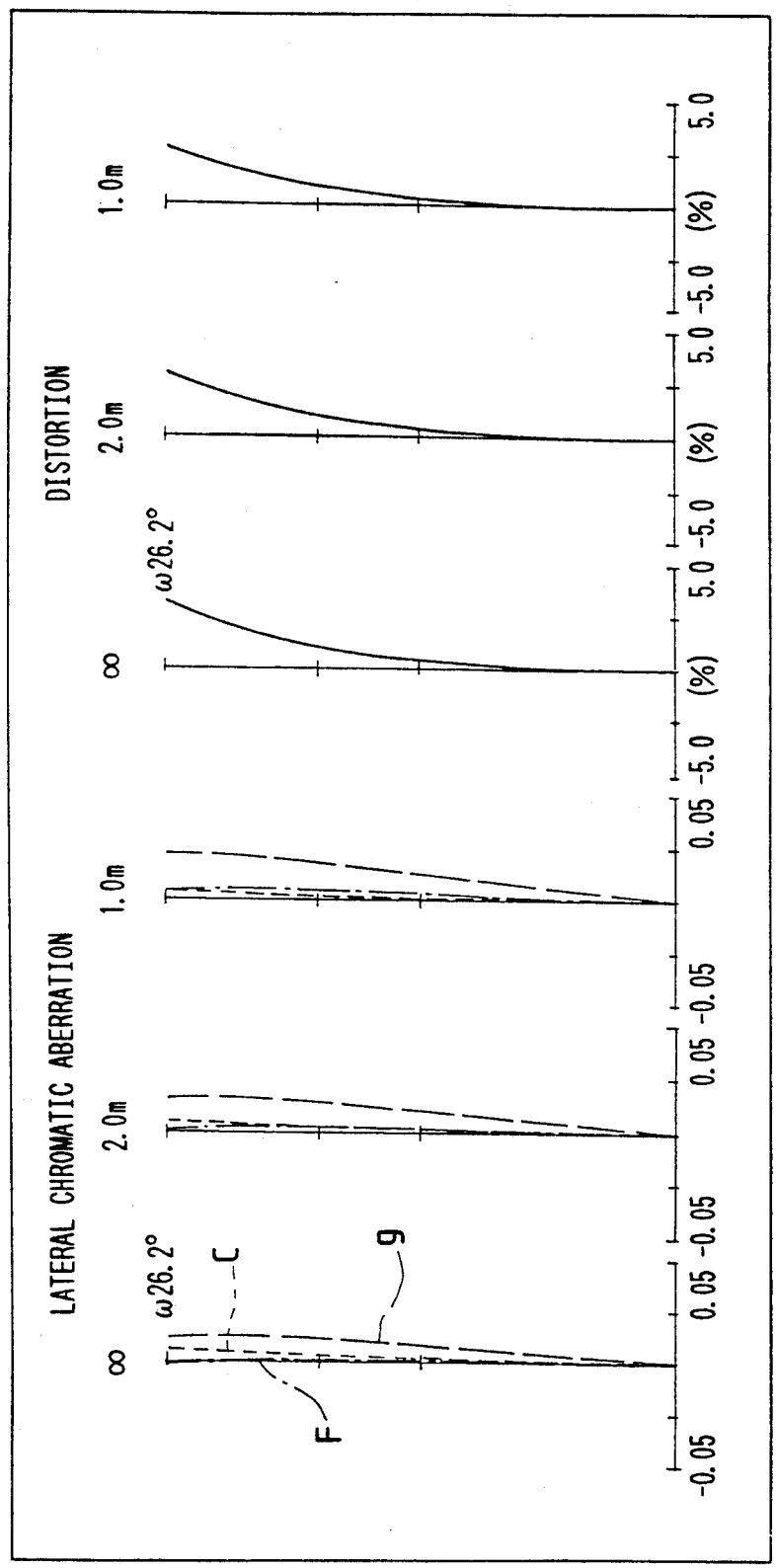
Figure 27:
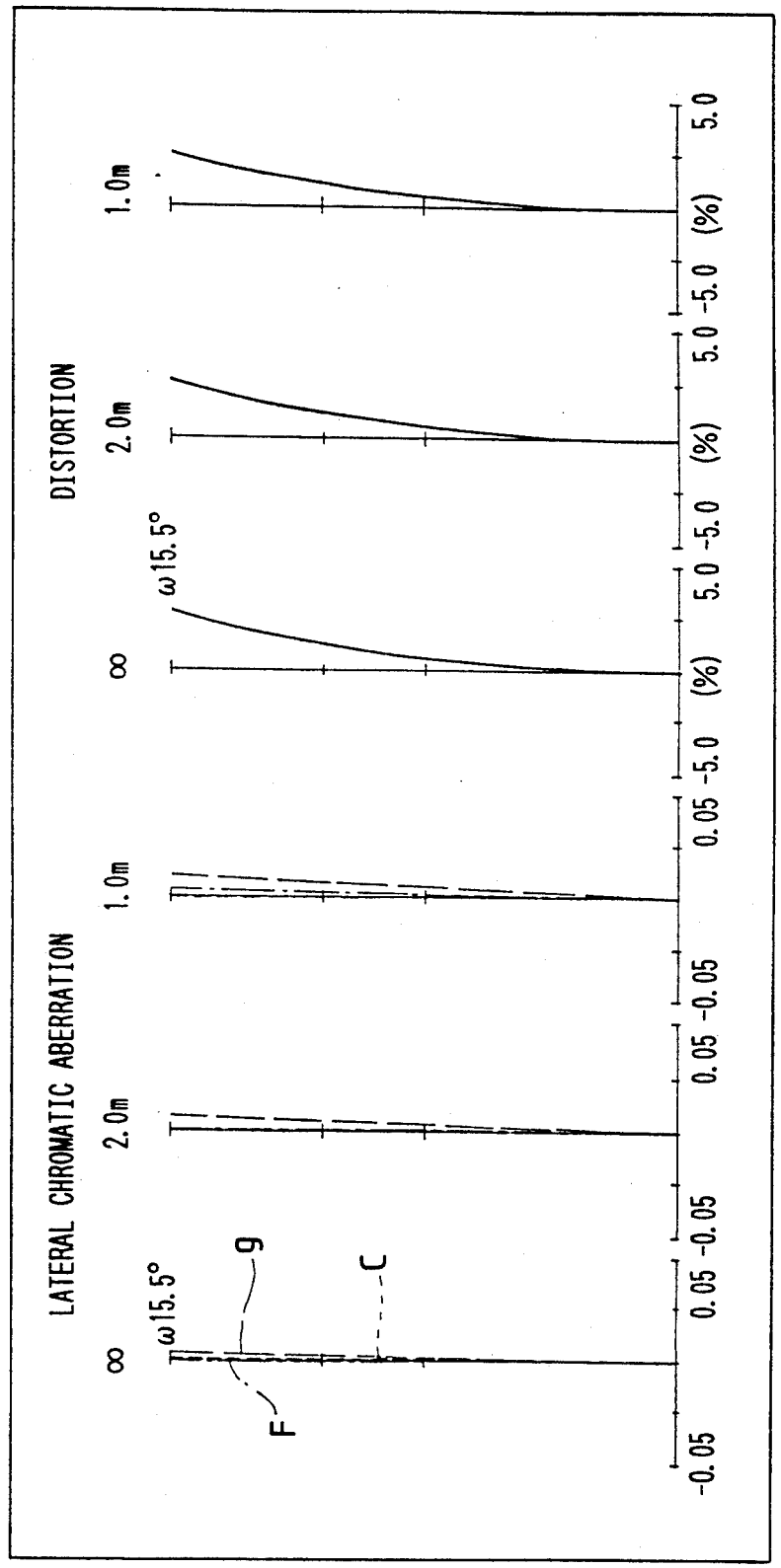
Figure 28:
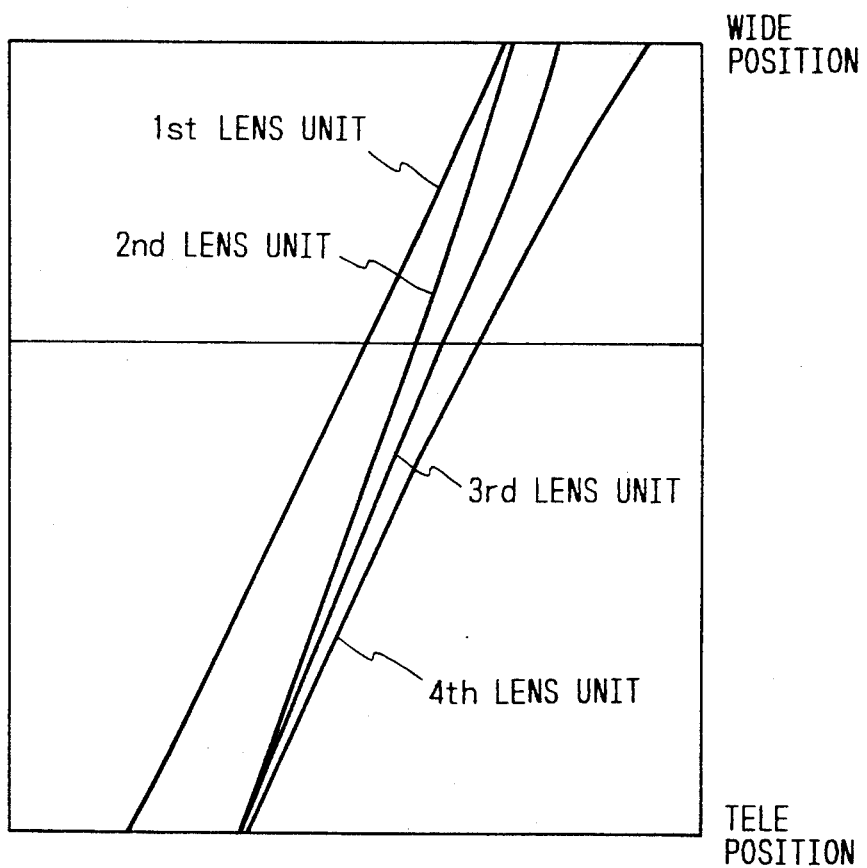
FIG. 28 shows a diagram illustrating moving loci for the lens units for zooming the zoom lens system according to the present invention.

When the Embodiment 3 is focused on objects located at distances of 2.0 m and 1.0 m respectively by moving the second lens unit and the third lens unit integrally, the zoom lens system has the spherical aberration and astigmatism illustrated in FIG. 22 through FIG. 24 at the wide position, intermediate focal length and tele position respectively, and the lateral chromatic aberration and distortion visualized in FIG. 25 through FIG. 27 at the wide position, intermediate focal length and tele position respectively. As is clarified by these drawings, the Embodiment 3 also has favorable optical performance and allows little variations to be caused by focusing.

In the embodiments described above, the moving distances and refractive powers, etc. of the focusing lens unit are as listed below:

| Embodiment 1 | |
|---|---|
| Moving distance of 2nd and 3rd lens units for object distance of 0.5 m. | |
| Wide position W | 0.343 |
| Intermediate focal length S | 0.373 |
| Tele position T | 0.419 |
| $\phi_{123W} = 0.056$, $\phi_{123T} = 0.051$, $\phi_4 = -0.042$ | |
| $\phi_{23W} = 0.04534$, $\phi_{23T} = 0.04558$, $Y_{23T} = 2.778$ | |
| $Y_{4T} = 2.823$, $Y_{234T} = 0.045$ | |

| Embodiment 2 | |
|---|---|
| Moving distance of 2nd and 3rd lens units for object distance of 1.0 m. | |
| Wide position W | 0.498 |
| Intermediate focal length S | 0.607 |
| Tele position T | 0.822 |
| Moving distance of 4th lens unit for object distance of 1.0 m. | |
| Wide position W | 0.949 |
| Intermediate focal length S | 0.659 |
| Tele position T | 0.769 |
| $\phi_{123W} = 0.049$, $\phi_{123T} = 0.0403$, $\phi_4 = -0.0363$ | |
| $\phi_{23W} = 0.03929$, $\phi_{23T} = 0.03917$, $Y_{23T} = 16.72$ | |
| $Y_{4T} = 16.86$, $Y_{234T} = 0.141$ | |

| Embodiment 3 | |
|---|---|
| Moving distance of 2nd and 3rd lens units for object distance of 1.0 m. | |
| Wide position W | 0.389 |
| Intermediate focal length | 0.471 |
| Tele position T | 0.613 |
| $\phi_{123W} = 0.056$, $\phi_{123T} = 0.047$, $\phi_4 = -0.035$ | |
| $\phi_{23W} = 0.03885$, $\phi_{23T} = 0.03926$, $Y_{23T} = 11.361$ | |
| $Y_{4T} = 13.346$, $Y_{234T} = 1.9849$ | |

When the direction of the optical axis is taken as the x axis and the direction perpendicular to the optical axis is taken as the y axis, the shapes of the aspherical surfaces used in the embodiment are expressed by the following formula:

$$x = \frac{y^2/r}{1 + \sqrt{1 - (y/r)^2}} + \Sigma A_{2i} y^{2i}$$

wherein the reference symbol r represents the radius of curvature on an aspherical surface of interest as measured in the vicinity of the optical axis and the reference symbol $A_{2i}$ designates the aspherical surface coefficient.

As is understood from the foregoing description, the zoom lens system according to the present invention covers the field angle of a wide-angle lens system, can be focused on an object located at a short distance on which the conventional zoom lens system cannot be focused, has a compact design and allows aberrations to be varied little by focusing.

I claim:

1. A zoom lens system consisting of, in order from the object side:
   a first lens unit having a positive refractive power,
   a second lens unit having a positive or negative refractive power,
   a third lens unit having a positive refractive power, and
   a fourth lens unit having a negative refractive power,
   wherein said zoom lens system varies focal length by moving said lens units in a direction along the optical axis, and
   wherein said zoom lens system performs focusing by moving at least one lens component disposed in said second lens unit, said third lens unit and said fourth lens unit in the direction along the optical axis while keeping said first lens unit fixed on the optical axis.

2. A zoom lens system according to claim 1 wherein said zoom lens system performs focusing by moving said fourth lens unit in the direction along the optical axis while keeping said first lens unit, said second lens unit and said third lens unit fixed on the optical axis.

3. A zoom lens system according to claim 2 wherein said zoom lens system varies focal length thereof from a wide position to a tele position by moving said first lens unit, said second lens unit, said third lens unit and said fourth lens unit toward the object side so as to widen the airspace reserved between said first lens unit and said second lens unit, and narrow the airspace reserved between said second lens unit and said third lens unit as well as the airspace reserved between said third lens unit and said fourth lens unit.

4. A zoom lens system according to claim 3 satisfying the following condition (1):

$$\beta_{4T} > |\beta_{3T}|, \beta_{4T} > |\beta_{2T}| \tag{1}$$

wherein the reference symbols $\beta_{2T}$, $\beta_{3T}$ and $\beta_{4T}$ represent the magnifications of the second lens unit, the third lens unit and the fourth lens unit respectively at the tele position.

5. A zoom lens system according to claim 1 wherein said zoom lens system performs focusing by moving said second lens unit and said third lens unit integrally in the direction along the optical axis while keeping said first lens unit and said fourth lens unit fixed on the optical axis.

6. A zoom lens system comprising, in order from the object side:
   a first lens unit having a positive refractive power,
   a second lens unit having a positive or negative refractive power,
   a third lens unit having a positive refractive power, and
   a fourth lens unit having a negative refractive power,
   wherein said zoom lens performs variation of focal length from a wide position to a tele position by moving each of said lens units along the optical axis toward the object side, and
   wherein said zoom lens system performs focusing by moving at least one lens component disposed in said second lens unit, said third lens unit and said fourth lens unit along the optical axis while keeping said first lens unit fixed.

7. A zoom lens system according to claim 6 wherein said zoom lens system performs focusing by moving said fourth lens unit in the direction along the optical axis while keeping said first lens unit, said second lens unit and said third lens unit fixed on the optical axis.

8. A zoom lens system according to claim 7 wherein said zoom lens system varies focal length thereof from a wide position to a tele position by moving said first lens unit, said second lens unit, said third lens unit and said fourth lens unit toward the object side so as to widen the airspace reserved between said first lens unit and said second lens unit, and narrow the airspace reserved between said second lens unit and said third lens unit as well as the airspace reserved between said third lens unit and said fourth lens unit.

9. A zoom lens system according to claim 8 satisfying the following condition (1):

$$\beta_{4T} > |\beta_{3T}|, \beta_{4T} > |\beta_{2T}| \tag{1}$$

wherein the reference symbols $\beta_{2T}$, $\beta_{3T}$ and $\beta_{4T}$ represent the magnifications of the second lens unit, the third lens unit and the fourth lens unit respectively at the tele position.

10. A zoom lens system according to claim 6 wherein said zoom lens system performs focusing by moving said second lens unit and said third lens unit integrally in the direction along the optical axis while keeping said first lens unit and said fourth lens unit fixed on the optical axis.

* * * * *